United States Patent
Shimizu et al.

(10) Patent No.: US 8,532,190 B2
(45) Date of Patent: Sep. 10, 2013

(54) VIDEO ENCODING METHOD AND DECODING METHOD, APPARATUSES THEREFOR, PROGRAMS THEREFOR, AND STORAGE MEDIA WHICH STORE THE PROGRAMS

(75) Inventors: Shinya Shimizu, Yokosuka (JP);
Hideaki Kimata, Yokosuka (JP);
Kazuto Kamikura, Yokosuka (JP);
Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 462 days.

(21) Appl. No.: 12/445,446

(22) PCT Filed: Oct. 24, 2007

(86) PCT No.: PCT/JP2007/070711
§ 371 (c)(1),
(2), (4) Date: Apr. 13, 2009

(87) PCT Pub. No.: WO2008/053758
PCT Pub. Date: May 8, 2008

(65) Prior Publication Data
US 2010/0008422 A1    Jan. 14, 2010

(30) Foreign Application Priority Data

Oct. 30, 2006  (JP) ................................. 2006-293901

(51) Int. Cl.
*H04N 11/02* (2006.01)
(52) U.S. Cl.
USPC .................................................... 375/240.16
(58) Field of Classification Search
None
See application file for complete search history.

(56) References Cited

U.S. PATENT DOCUMENTS 6,148,028 A * 11/2000 Kikuchi et al. ............... 375/240
6,275,532 B1 * 8/2001 Hibi et al. ................. 375/240.17

(Continued)

FOREIGN PATENT DOCUMENTS

CN    1910931 A    2/2007
EP    1835747 A1    9/2007

(Continued)

OTHER PUBLICATIONS

Lee, Sang-Heon, et al., "Disparity vector prediction methods in MVC," Joint Video Team (JVT) of ISO/IEC MPEG & ITU-T VCEG (ISO/IEC JTC1/SC29/WG11 and ITU-T SG16 Q.6), Doc. JVT-U040r1, 21st Meeting: Hangzhou, China, Oct. 20-27, 2006.

(Continued)

*Primary Examiner* — David Czekaj
*Assistant Examiner* — Leron Beck
(74) *Attorney, Agent, or Firm* — Harness, Dickey & Pierce, P.L.C.

(57) ABSTRACT

A video encoding method includes selecting a reference vector target frame and a reference frame from among already-encoded frames; encoding information for designating each frame; setting a reference vector for indicating an area in the reference vector target frame with respect to an encoding target area; encoding the reference vector; performing a corresponding area search by using image information of a reference vector target area, which belongs to the reference vector target frame and is indicated by the reference vector, and the reference frame; determining a reference area in the reference frame based on the search result; generating a predicted image by using image information of the reference frame, which corresponds to the reference area; and encoding differential information between image information of the encoding target area and the predicted image.

16 Claims, 14 Drawing Sheets

(56) References Cited

U.S. PATENT DOCUMENTS

| | | | |
|---|---|---|---|
| 6,690,835 B1* | 2/2004 | Brockmeyer et al. | 382/236 |
| 7,286,689 B2* | 10/2007 | Damera-Venkata et al. | 382/107 |
| 7,720,153 B2* | 5/2010 | Sugimoto et al. | 375/240.16 |
| 2004/0223548 A1* | 11/2004 | Kato et al. | 375/240.16 |
| 2004/0233991 A1* | 11/2004 | Sugimoto et al. | 375/240.16 |
| 2005/0031035 A1 | 2/2005 | Vedula et al. | |
| 2005/0185048 A1* | 8/2005 | Ha | 348/42 |
| 2007/0189396 A1 | 8/2007 | Kitahara et al. | |

FOREIGN PATENT DOCUMENTS

| | | |
|---|---|---|
| JP | 2-062180 A | 3/1990 |
| JP | 9-284777 A | 10/1997 |
| RU | 2 237 283 C2 | 9/2004 |
| RU | 2 273 113 C2 | 3/2006 |
| WO | 2006/001653 A1 | 1/2006 |
| WO | 2006/016418 A1 | 2/2006 |
| WO | WO-2006073116 A1 | 7/2006 |

OTHER PUBLICATIONS

Koo, Han-Suh, et al., "Motion Skip Mode for MVC," Joint Video Team (JVT) of ISO/IEC MPEG & ITU-T VCEG (ISO/IEC JTC1/SC29/WG11 and ITU-T SG16 Q.6), Doc. JVT-U091-L, 21st Meeting: Hangzhou, China, Oct. 23-27, 2006.

Lee, Sang-Heon, et al., "Inter-view motion information prediction method in MVC," Joint Video Team (JVT) of ISO/IEC MPEG & ITU-T VCEG (ISO/IEC JTC1/SC29/WG11 and ITU-T SG16 Q.6), Doc. JVT-T135, 20th Meeting: Klagenfurt, Austria, Jul. 15-21, 2006.

Merkle, P., et al., "Efficient Compression of Multi-view Video Exploiting Inter-view Dependencies Based on H.264/MPEG4-AVC," 2006 IEEE International Conference on Multimedia and Expo, Jul. 1, 2006, pp. 1717-1720.

Yang, Haitao, et al., "Regional Disparity Based Motion and Disparity Prediction for MVC," Joint Video Team (JVT) of ISO/IEC MPEG & ITU-T VCEG (ISO/IEC JTC1/SC29/WG11 and ITU-T SG16 Q.6), Doc. JVT-V071, 22nd Meeting: Marrakech, Morocco, Jan. 13-19, 2007.

Vetro, Anthony, et al., "Joint Multiview Video Model (JMVM) 1.0," Joint Video Team (JVT) of ISO/IEC MPEG & ITU-T VCEG, JVT-T208, 20th Meeting: Klagenfurt, Austria, Jul. 15-21, 2006, sections 3-4.1.

ITU-T Rec. H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 63-64, Sep. 2002 (in English).

Kimata, Hideaki and Kitahara, Masaki, "Preliminary Results on Multiple View Video Coding (3DAV)", document M10976 MPEG Redmond Meeting, Jul. 2004 (in English).

Shimizu, Shinya, Kitahara, Masaki, Kamikura, Kazuto and Yashima, Yoshiyuki, "Multi-view Video Coding based on 3-D Warping with Depth Map", In Proceedings of Picture Coding Symposium 2006, SS 3-6, Apr. 2006 (in English).

Martinian, Emin, et al., "V-Picture Syntax for Random Access in Multi-view Video Compression," ISO/IEC JTC1/SC29/WG11, M13121, Montreux, Switzerland, Apr. 2006.

* cited by examiner

8x16

16x8

VIDEO ENCODING METHOD AND DECODING METHOD, APPARATUSES THEREFOR, PROGRAMS THEREFOR, AND STORAGE MEDIA WHICH STORE THE PROGRAMS

TECHNICAL FIELD

The present invention relates to a video encoding method for encoding a video image using an interframe predictive encoding method and a corresponding apparatus; a video decoding method for decoding encoded data generated by the video encoding method and a corresponding apparatus; a video encoding program for implementing the video encoding method and a computer-readable storage medium which stores the program; and a video decoding program for implementing the video decoding method and a computer-readable storage medium which stores the program.

Priority is claimed on Japanese Patent Application No. 2006-293901, filed Oct. 30, 2006, the contents of which are incorporated herein by reference.

BACKGROUND ART

Multi-viewpoint video images are a plurality of video images obtained by photographing the same object and background thereof using a plurality of cameras. Below, a video image obtained by a single camera is called a "two-dimensional video image", and a set of multiple two-dimensional video images obtained by photographing the same object and background thereof is called a "multi-viewpoint video image".

There is a strong temporal correlation in the two-dimensional video image of each camera, which is included in a multi-viewpoint video image. In addition, when the cameras are synchronized with each other, the images (taken by the cameras) corresponding to the same time capture the object and background thereof in entirely the same state from different positions, so that there is a strong correlation between the cameras. The encoding efficiency of video encoding can be improved using this correlation.

First, conventional techniques relating to the encoding of two-dimensional video images will be shown.

In many known methods of encoding two-dimensional video images, such as MPEG-2 and H.264 (which are international video encoding standards), and the like, high encoding efficiency is obtained by means of interframe predictive encoding which uses a temporal correlation.

The interframe predictive encoding executed for encoding two-dimensional video images uses a temporal variation in a video image, that is, a motion. Therefore, the method used in the interframe predictive encoding is generally called "motion compensation". Accordingly, the interframe predictive encoding along a temporal axis is called "motion compensation", below. In addition, "frame" is an image which is a constituent of a video image and is obtained at a specific time.

Generally, two-dimensional video encoding has the following encoding modes for each frame: "I frame" encoded without using an interframe correlation, "P frame" encoded while performing motion compensation based on one already-encoded frame, and "B frame" encoded while performing motion compensation based on two already-encoded frames.

In order to further improve the efficiency of video image prediction, in H.263 and H.264, decoded images of a plurality of frames (i.e., two frames or more) are stored in a reference image memory, and a reference image is selected from the images of the memory to perform prediction.

The reference image can be selected for each block, and reference image designation information for designating the reference image can be encoded to perform the corresponding decoding.

For "P frame", one piece of reference image designation information is encoded for each block. For "B frame", two pieces of reference image designation information elements are encoded for each block.

In motion compensation, in addition to the reference image designation information, a vector for indicating a position in the reference image is encoded, where a target block is encoded by using the position, and the vector is called a "motion vector". Similar to the reference image designation information, one motion vector is encoded for "P frame", and two motion vectors are encoded for "B frame".

In encoding of the motion vector in MPEG-4 or H.264, a predicted vector is generated using a motion vector of a block adjacent to an encoding target block, and only a differential vector between the predicted vector and the motion vector used in motion compensation applied to the target block. In accordance with this method, when motion continuity is present between the relevant adjacent blocks, the motion vector can be encoded with a high level of encoding efficiency.

Non-Patent Document 1 discloses a process of generating a predicted vector in H.264, and the general explanation thereof is presented below.

In H.264, as shown in FIG. 13A, based on motion vectors (mv_a, mv_b, and mv_c) used in a left side block (see "a" in FIG. 13A), an upper side block (see "b" in FIG. 13A), and an upper-right side block (see "c" in FIG. 13A) of an encoding target block, horizontal and vertical components are obtained by computing the median for each direction.

As H.264 employs a variable block size motion compensation, the block size for motion compensation may not be the same between the target block and peripheral blocks thereof. In such a case, as shown in FIG. 13B, block "a" is set to the uppermost block among left side blocks adjacent to the target block, block "b" is set to the leftmost block among upper side blocks adjacent to the target block, and block "c" is set to the closest upper-left block.

As an exception, if the size of the target block is 8×16 pixels, as shown in FIG. 13C, instead of the median, block "a" and block "c" are respectively used for predicting the left and right blocks. Similarly, if the size of the target block is 16×8 pixels, as shown in FIG. 13D, instead of the median, block "a" and block "b" are respectively used for predicting the lower and upper blocks.

As described above, in H.264, a reference frame is selected for each block from among a plurality of already-encoded frames, and is used for motion compensation.

Generally, the motion of the imaged object is not uniform and depends on the reference frame. Therefore, in comparison with a motion vector in motion compensation performed using a reference frame different from that of the target block, a motion vector in motion compensation performed using the same reference frame as the target block should be close to a motion vector used for the target block.

Therefore, in H.264, if there is only one block (among the blocks a, b, and c) whose reference frame is the same as that of the encoding target block, then instead of the median, the motion vector of the relevant block is used as a predicted vector so as to generate a predicted vector having a relatively higher level of reliability.

Next, conventional encoding methods for multi-viewpoint video images will be explained.

Generally, multi-viewpoint video encoding uses a correlation between cameras, and a high level of encoding efficiency is obtained by using "disparity compensation" in which motion compensation is applied to frames which are obtained at the same time by using different cameras.

For example, MPEG-2 Multiview profile or Non-Patent Document 2 employ such a method.

In the method disclosed in Non-Patent Document 2, any one of motion compensation and disparity compensation is selected for each block. That is, one having a higher encoding efficiency is selected for each block, so that both the temporal correlation and the inter-camera correlation can be used. In comparison with a case of using only one type of correlation, a higher encoding efficiency is obtained.

In disparity compensation, in addition to a prediction residual, a disparity vector is also encoded. The disparity vector corresponds to the motion vector for indicating a temporal variation between frames, and indicates a difference between positions on image planes, which are obtained by cameras arranged at different positions, and onto which a single position on the imaged object is projected.

FIG. 14 is a schematic view showing the concept of disparity generated between such cameras. In the schematic view of FIG. 14, image planes of cameras, whose optical axes are parallel to each other, are observed vertically from the upper side thereof.

In the encoding of the disparity vector, similar to the encoding of the motion vector, it is possible that a predicted vector is generated using a disparity vector of a block adjacent to the encoding target block, and only a differential vector between the predicted vector and the disparity vector used in disparity compensation applied to the target block is encoded. In accordance with such a method, when there is disparity continuity between the relevant adjacent blocks, the disparity vector can be encoded with a high level of encoding efficiency.

For each frame in multi-viewpoint video images, temporal redundancy and redundancy between cameras are present at the same time. Non-Patent Document 3 discloses a method for removing both redundancies simultaneously.

In the relevant method, temporal prediction of a differential image between an original image and a disparity-compensated image is performed so as to execute the relevant encoding. That is, after the disparity compensation, a residual of motion compensation in the differential image is encoded.

In accordance with the above method, temporal redundancy, which cannot be removed by a disparity compensation for removing the inter-camera redundancy, can be removed using the motion compensation. Therefore, a prediction residual, which is finally encoded, is reduced, so that a high level of encoding efficiency can be achieved.

Non-Patent Document 1: ITU-T Rec.H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 63-64, September 2002.

Non-Patent Document 2: Hideaki Kimata and Masaki Kitahara, "Preliminary results on multiple view video coding (3DAV)", document M10976 MPEG Redmond Meeting, July 2004.

Non-Patent Document 3: Shinya Shimizu, Masaki Kitahara, Kazuto Kamikura and Yoshiyuki Yashima, "Multi-view Video Coding based on 3-D Warping with Depth Map", In Proceedings of Picture Coding Symposium 2006, SS3-6, April 2006.

DISCLOSURE OF INVENTION

Problem to be Solved by the Invention

The conventional methods, in which the motion vector or disparity vector, which is actually used in the encoding target block, is encoded using the difference from a predicted vector generated using a motion vector or disparity vector used in an adjacent block, are based on a fact that the imaged object has continuity in the real space, and the probability that the motion of the imaged object itself does not change considerably is high. Therefore, the motion vector or disparity vector used in the target block can be encoded with a reduced amount of code.

However, if a reference frame, which is most suitable for predicting the image of the target block, is not used in the relevant adjacent block, the difference between the predicted vector and the actually-used motion vector increases, and the amount of code cannot be sufficiently reduced.

In particular, when performing encoding by adaptively selecting the motion compensation or the disparity compensation for each block, it is impossible to generate a predicted vector of the disparity vector from the motion vector, or to generate a predicted vector of the motion vector from the disparity vector because the motion vector and the disparity vector have considerably different characteristics. Therefore, it is impossible to efficiently encode the motion vector or the disparity vector.

On the other hand, in the methods applied to "B frame" or disclosed in Non-Patent Document 3, video prediction is more accurately performed, and the size of the residual signal which is finally encoded is reduced, so that the video image can be encoded with a smaller amount of code.

However, for "B frame", two pieces of reference image designation information and two pieces of vector information must be encoded, and thus the amount of code of such additional information used for generating a predicted image is increased.

Also in the method of Non-Patent Document 3, "Depth" information for generating a disparity-compensated image and a motion vector for performing motion compensation on a differential image for the disparity compensation should be encoded, which increases the amount of information used for video prediction.

In light of the above circumstances, an object of the present invention relating to the video encoding is to provide a novel technique for efficiently encoding vector information (as an encoding target) used for interframe predictive encoding even when the reference frame used in the interframe predictive encoding is different between an encoding target area and an adjacent area thereof.

Means for Solving the Problem

In order to achieve the above object, the present invention provides a video encoding method for encoding a video image by dividing an entire image into areas, generating a predicted image for each area of the divided image based on image information of a plurality of already-encoded frames, and encoding differential information between an image of an encoding target area in an encoding target frame and the predicted image, the video encoding method comprising:

a reference vector target frame selecting step of selecting a reference vector target frame from among the already-encoded frames;

a reference vector target frame designation information encoding step of encoding information which designates the reference vector target frame;

a reference vector setting step of setting a reference vector which indicates an area which belongs to the reference vector target frame and corresponds to the encoding target area;

a reference vector encoding step of encoding the reference vector;

a reference frame selecting step of selecting a reference frame from among the already-encoded frames;

a reference frame designation information encoding step of encoding information which designates the reference frame;

a reference frame area setting step of searching for a corresponding area by using the reference frame and image information of the reference vector target area which belongs to the reference vector target frame and is indicated by the reference vector; and setting a reference area in the reference frame based on the search result;

a predicted image generating step of generating the predicted image by using image information of the reference frame, which corresponds to the reference area; and a differential information encoding step of encoding differential information between image information of the encoding target area and the generated predicted image.

In a typical example, in the predicted image generating step, the predicted image is generated using image information of the reference area and the image information of the reference vector target area.

In another typical example, in the predicted image generating step, it is selected whether the predicted image is generated using image information of the reference area, or using the image information of the reference area and the image information of the reference vector target area, and the predicted image is generated by the selected generating method; and the video encoding method further comprises:

a predicted image generating method designation information encoding step of encoding information which designates the selected generating method.

In another typical example, if the reference frame selected in the reference frame selecting step is a reference frame which was used when encoding the reference vector target area, then the reference area set in the reference frame area setting step is a reference area which was used when encoding the reference vector target area.

In another typical example, if the reference frame selected in the reference frame selecting step is a reference vector target frame which was used when encoding the reference vector target area, then the reference area set in the reference frame area setting step is a reference vector target area which was used when encoding the reference vector target area.

In another typical example, if the reference frame selected in the reference frame selecting step is an already-encoded frame, where time and viewpoint information relationships between this already-encoded frame and the encoding target frame coincide with those between a reference vector target frame which was used when encoding the reference vector target area and the reference vector target frame set for the encoding target area, then the reference area set in the reference frame area setting step is an area which belongs to the selected reference frame and is indicated by a vector whose starting point is set at the encoding target area and which has the same direction and size as a reference vector which was used when encoding the reference vector target area.

In another typical example, if the reference frame selected in the reference frame selecting step is an already-encoded frame, where time and viewpoint information relationships between this already-encoded frame and the encoding target frame coincide with those between a reference frame which was used when encoding the reference vector target area and the reference vector target frame set for the encoding target area, then the reference area set in the reference frame area setting step is an area which belongs to the selected reference frame and is indicated by a vector whose starting point is set at the encoding target area and which has the same direction and size as a vector which indicates a corresponding relationship between the reference vector target area and a reference area which was used when encoding the reference vector target area.

In a preferable example, the video encoding method further comprises:

an intermediate frame setting step of setting an intermediate frame which differs from each of the reference vector target frame and the reference frame, and is already encoded, wherein:

in the reference frame area setting step, an intermediate area in the intermediate frame is set using information of the reference vector target area, and the reference area is set using information of the intermediate area or the set of the information of the intermediate area and information of the reference vector target area.

In the above case, it is possible that:

the intermediate frame set in the intermediate frame setting step is an already-encoded frame, where time and viewpoint information relationships between this already-encoded frame and the reference vector target frame coincide with those between the encoding target frame and the reference frame; and in the predicted image generating step, the predicted image is generated using image information of the reference area, image information of the intermediate area, and the image information of the reference vector target area.

Also in the above case, it is possible that:

the intermediate frame set in the intermediate frame setting step is an already-encoded frame, where time and viewpoint information relationships between this already-encoded frame and the reference vector target frame coincide with those between the encoding target frame and the reference frame;

in the predicted image generating step, it is selected whether the predicted image is generated using image information of the reference area, using the image information of the reference area and the image information of the reference vector target area, or using the image information of the reference area, image information of the intermediate area, and the image information of the reference vector target area, and the predicted image is generated by the selected generating method; and the video encoding method further comprises:

a predicted image generating method designation information encoding step of encoding information which designates the selected generating method.

When there is the predicted image generating method designation information encoding step, it is possible that:

in the reference frame designation information encoding step, a code word table used for encoding the information which designates the reference frame is switched based on encoded data of the reference vector target area; and in the predicted image generating method designation information encoding step, a code word table used for encoding the information which designates the selected generating method is switched based on at least one of the encoded data of the reference vector target area, the reference frame, and the reference vector target frame.

The present invention also provides a video decoding method for decoding a video image by dividing an entire image into areas, generating a predicted image for each area of the divided image based on image information of a plurality of already-decoded frames, and decoding differential information between the predicted image and an image of a decoding target area in a decoding target frame, the video decoding method comprising:

a reference vector target frame designation information decoding step of decoding, from encoded data, information which designates a reference vector target frame selected from among the already-decoded frames;

a reference vector decoding step of decoding, from the encoded data, a reference vector which indicates an area which belongs to the reference vector target frame and is set in correspondence to the decoding target area;

a reference frame designation information decoding step of decoding, from the encoded data, information which designates a reference frame selected from among the already-decoded frames;

a reference frame area setting step of searching for a corresponding area by using the reference frame and image information of the reference vector target area which belongs to the reference vector target frame and is indicated by the reference vector; and setting a reference area in the reference frame based on the search result; and a predicted image generating step of generating the predicted image by using image information of the reference frame, which corresponds to the reference area.

In a typical example, in the predicted image generating step, the predicted image is generated using image information of the reference area and the image information of the reference vector target area.

In another typical example, a predicted image generating method designation information decoding step of decoding, from the encoded data, information which designates whether the predicted image is generated using image information of the reference area, or using the image information of the reference area and the image information of the reference vector target area, wherein:

in the predicted image generating step, the predicted image is generated by the generating method designated by the decoded information.

In another typical example, if a frame indicated by reference frame designation information which was decoded when decoding the reference vector target area coincides with the reference frame, then in the reference frame area setting step, a reference area which was used when decoding the reference vector target area is set as the reference area.

In another typical example, if a frame indicated by reference vector target frame designation information which was decoded when decoding the reference vector target area coincides with the reference frame, then in the reference frame area setting step, a reference vector target area which was used when decoding the above reference vector target area is set as the reference area.

In another typical example, if time and viewpoint information relationships between the reference vector target frame and a frame indicated by reference vector target frame designation information which was decoded when decoding the reference vector target area coincide with those between the decoding target frame and the reference frame, then in the reference frame area setting step, an area, which belongs to the reference frame and is indicated by a vector whose starting point is set at the decoding target area and which has the same direction and size as a reference vector which was used when decoding the reference vector target area, is set as the reference area.

In another typical example, if time and viewpoint information relationships between the reference vector target frame and a frame indicated by reference frame designation information which was decoded when decoding the reference vector target area coincide with those between the decoding target frame and the reference frame, then in the reference frame area setting step, an area, which belongs to the reference frame and is indicated by a vector whose starting point is set at the decoding target area and which has the same direction and size as a vector which indicates a corresponding relationship between the reference vector target area and a reference area which was used when decoding the reference vector target area, is set as the reference area.

In a preferable example, the video decoding method further comprises:

an intermediate frame setting step of setting an intermediate frame which differs from each of the reference vector target frame and the reference frame, and is already decoded, wherein:

in the reference frame area setting step, an intermediate area in the intermediate frame is set using information of the reference vector target area, and the reference area is set using information of the intermediate area or the set of the information of the intermediate area and information of the reference vector target area.

In the above case, it is possible that:

the intermediate frame set in the intermediate frame setting step is an already-decoded frame, where time and viewpoint information relationships between this already-decoded frame and the reference vector target frame coincide with those between the decoding target frame and the reference frame; and in the predicted image generating step, the predicted image is generated using image information of the reference area, image information of the intermediate area, and the image information of the reference vector target area.

Also in the above case, it is possible that:

the intermediate frame set in the intermediate frame setting step is an already-decoded frame, where time and viewpoint information relationships between this already-decoded frame and the reference vector target frame coincide with those between the decoding target frame and the reference frame;

the video decoding method further comprises:

a predicted image generating method designation information decoding step of decoding, from the encoded data, information which designates whether the predicted image is generated using image information of the reference area, using the image information of the reference area and the image information of the reference vector target area, or using the image information of the reference area, image information of the intermediate area, and the image information of the reference vector target area; and in the predicted image generating step, the predicted image is generated using the generating method designated by the decoded information.

When there is the predicted image generating method designation information decoding step, it is possible that:

in the reference frame designation information decoding step, a code word table used for decoding the information which designates the reference frame is switched based on decoded data of the reference vector target area; and in the predicted image generating method designation information decoding step, a code word table used for decoding the information which designates the predicted image generating method is switched based on at least one of the decoded data of the reference vector target area, the reference frame, and the reference vector target frame.

The present invention also provides a video encoding apparatus having devices for performing the steps in the above-described video encoding method; a video encoding program by which a computer executes the relevant steps; and a computer-readable storage medium which stores the program.

The present invention also provides a video decoding apparatus having devices for performing the steps in the above-described video decoding method; a video decoding program by which a computer executes the relevant steps; and a computer-readable storage medium which stores the program.

Effect of the Invention

In accordance with the present invention, even when the reference frame used for generating a predicted image is different between adjacent areas, the same reference vector target frame is used, so that the primary factor (time or disparity) which causes an image variation and should be represented by a vector is unified, and a predicted vector close to a vector which should be encoded can be generated using an already-encoded vector in an adjacent area. Therefore, vector information for interframe predictive encoding can be encoded with a reduced amount of code.

Figure 1:
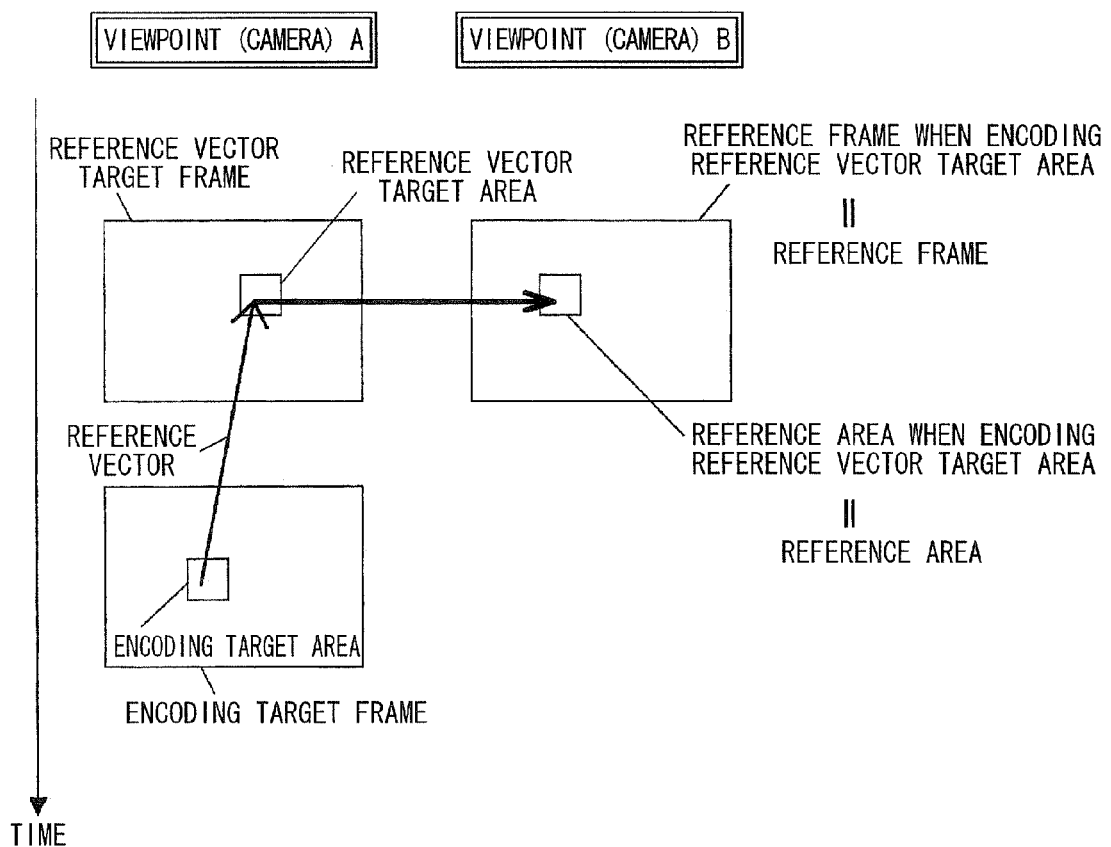
FIG. 1 is a schematic diagram showing an example of the reference area determination method using a reference frame when a reference vector target area was encoded.

| Reference Symbols | |
|---|---|
| 100 | video encoding apparatus |
| 101 | image input unit |
| 102 | predicted image generator |
| 103 | differential image encoder |
| 104 | differential image decoder |
| 105 | reference frame memory |
| 106 | reference frame setting unit |
| 107 | reference vector target frame setting unit |
| 108 | predicted image generating method setting unit |
| 109 | additional information encoder |
| 110 | reference vector target area search unit |
| 111 | reference area search unit |
| 112 | corresponding relationship information accumulating memory |
| 113 | predicted reference vector generator |
| 114 | differential reference vector encoder |

BEST MODE FOR CARRYING OUT THE INVENTION

In the present invention, when setting vector information used for interframe predictive encoding, which is performed in the encoding of image information of an encoding target area, not a vector which indicates an area on a reference frame for generating a predicted image, but a reference vector target frame, which is a frame used for indicating a vector, is set. A reference vector which indicates an area on the reference vector target frame is obtained and encoded, and a corresponding-point search such as block matching is performed using a reference frame and image information of a reference vector target area on the reference vector target frame, where the area is indicated by the reference vector. A predicted image is generated using image information of a reference area on the reference frame, which is obtained in accordance with the corresponding-point search.

Accordingly, even when the reference frame is different between adjacent areas, vector information for the interframe predictive encoding can be efficiently encoded.

In conventional methods, vector information, which is encoded for each encoding target area (i.e., a unit encoding area) and is used for interframe predictive encoding, is represented by a vector which indicates an image variation from a reference frame, which is set for each encoding target area, to an encoding target frame.

Therefore, in the conventional methods, when the reference frame is different between adjacent areas, the primary factor (time or camera, or long time or short time) that causes an image variation indicated by the relevant vector is also different, and the image variation represented by a predicted vector may differ from an image variation represented by a target vector to be encoded.

In such a case, the target vector to be encoded cannot be accurately predicted by the generated predicted vector. Furthermore, the amount of code required for encoding a differential vector between the target vector and the predicted vector may be larger than that required for directly encoding the target vector.

In contrast, in accordance with the present invention, even when the reference frame used for generating a predicted image is different between adjacent areas, the same reference vector target frame is used so that the primary factor for causing an image variation indicated by the relevant vector is unified, and a predicted vector close to a vector to be encoded can be generated. Therefore, vector information for interframe predictive encoding can be encoded with a smaller amount of code.

Additionally, reference vector target frame designation information for designating the reference vector target frame and reference frame designation information for designating the reference frame may be individually encoded, or commonly encoded as information which can designate the reference vector target frame and the reference frame.

That is, when there are two already-encoded frames, (i) if the reference vector target frame designation information and the reference frame designation information are individually encoded, a value (0 or 1) may be encoded for each of them, and (i) if information which can designate the reference vector target frame and the reference frame is encoded, then information which indicates any one of (0,0), (0,1), (1,0), and (1,1) may be encoded.

Additionally, in the present invention, as one reference vector is encoded for an encoding target area, two corresponding areas are obtained respectively on the reference vector target frame and the reference frame. Therefore, similar to "B frame", the predicted image can be generated using image information of the two areas.

When such two corresponding areas are obtained, encoding can be performed by selecting whether the predicted image is generated using image information of both corresponding areas or using only image information of the corresponding area (i.e., reference area) on the reference frame.

However, in such a case, information that indicates by which method the predicted image was generated should be encoded.

As a criterion for selecting the predicted image generating method, (i) a rate-distortion cost computed when encoding the relevant area by using the predicted image, (ii) the sum of the absolute values of differences between the input image and the predicted image, or (iii) a variance of pixel values of a predicted residual image generated by differences between the input image and the predicted image, may be used, and any criterion may be employed.

When encoding the information which designates the predicted image generating method, the information may be directly encoded, or be encoded together with another information that should also be encoded. For example, it may be encoded together with the reference vector target frame designation information or the reference frame designation information.

That is, (i) "0 or 1" may be encoded as the reference frame designation information and "0 or 1" may be encoded as the predicted image generating method designation information, or (ii) information which indicates any one of (0,0), (0,1), (1,0), and (1,1) may be encoded for the combination of the reference frame designation information and the predicted image generating method designation information.

As the reference frame, a reference frame used when a reference vector target area was encoded may be selected, or a reference vector target frame used when the reference vector target area was encoded may be selected.

In such cases, as a reference area in the reference frame in each case, an area used as a reference area when encoding the reference vector target area or an area used as a reference vector target area when encoding the reference vector target area may be appropriately set.

Figure 2:
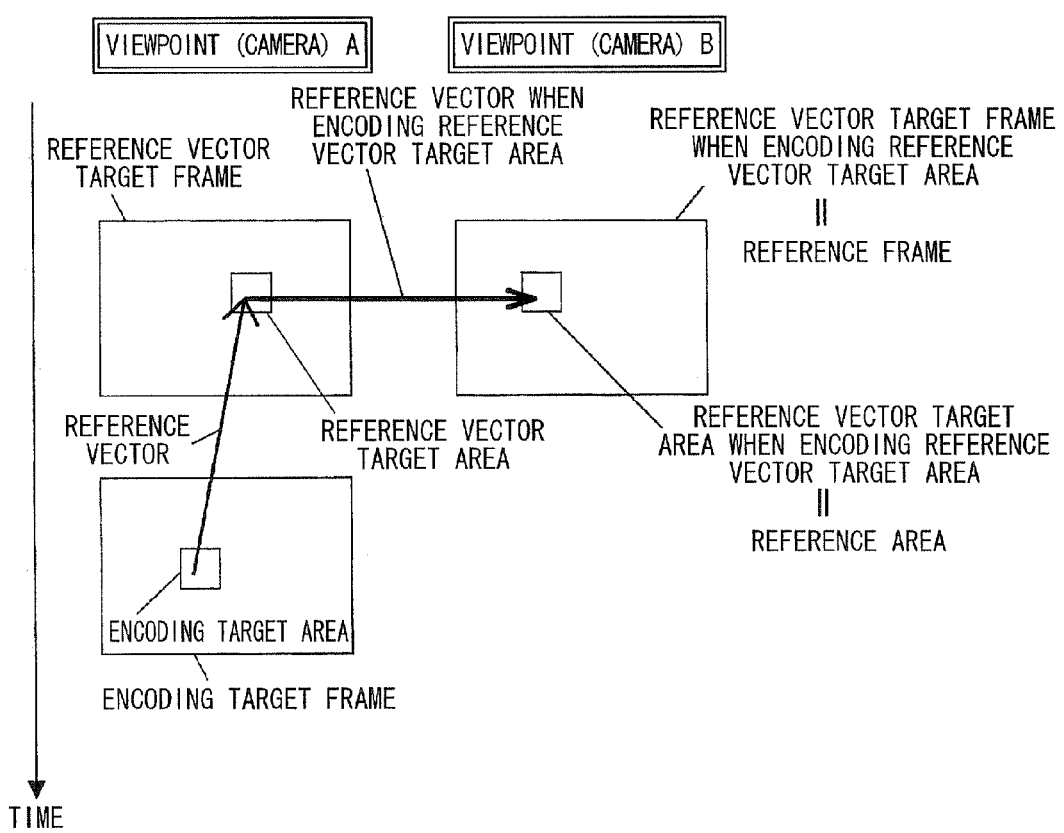
FIG. 2 is a schematic diagram showing an example of the reference area determination method using a reference vector target frame when a reference vector target area was encoded.

FIGS. 1 and 2 show an example of the reference area set by such methods.

FIG. 1 shows an example of the process performed when a reference frame used when a reference vector target area was encoded is selected as the current reference frame, and an area which was used as a reference area when encoding the reference vector target area is selected as the reference area in the current reference frame.

FIG. 2 shows an example of the process performed when a reference vector target frame used when a reference vector target area was encoded is selected as the current reference frame, and an area which was used as a reference vector target area when encoding the current reference vector target area is selected as the reference area in the current reference frame.

The area, which was selected as a reference vector target area or a reference area when encoding the current reference vector target area, was used for predicting the image information of the current reference vector target area, and thus has image information close to the image information of the current reference vector target area. Specifically, such an area belongs to a reference vector target frame or a reference frame, which was used when encoding the current reference vector target area.

That is, even when obtaining an area in a reference frame, which corresponds to the reference vector target area, if this reference frame coincides with the relevant frame (i.e., reference vector target frame or reference frame) used in each of the above-described cases, then an area which was selected as a reference vector target area or a reference area when encoding the above reference vector target area is selected.

Accordingly, as the reference area in the reference frame is determined based on encoding information of the reference vector target area, it is possible to reduce the number of execution times of the corresponding-area search, which should be performed in encoding and decoding, while keeping a required quality of the predicted image.

As the reference frame:
(i) an already-encoded frame may be selected, where relationships, which are equal to time and viewpoint information relationships between a reference vector target frame used when encoding the reference vector target area and a reference vector target frame set for the encoding target area, can be established between the already-encoded frame and the encoding target frame, or
(ii) an already-encoded frame may be selected, where relationships, which are equal to time and viewpoint information relationships between a reference frame used when encoding the reference vector target area and a reference vector target frame set for the encoding target area, can be established between the already-encoded frame and the encoding target frame.

For each case, as the reference area:
(i) an area in the (selected) reference frame may be set, where the area is indicated by a vector which starts from the encoding target area and has the same direction and size as a reference vector used when encoding the reference vector target area, or
(ii) an area in the (selected) reference frame may be set, where the area is indicated by a vector which starts from the encoding target area and has the same direction and size as a vector which indicates a corresponding relationship between the reference vector target area and a reference area used when encoding the reference vector target area.

Figure 3:
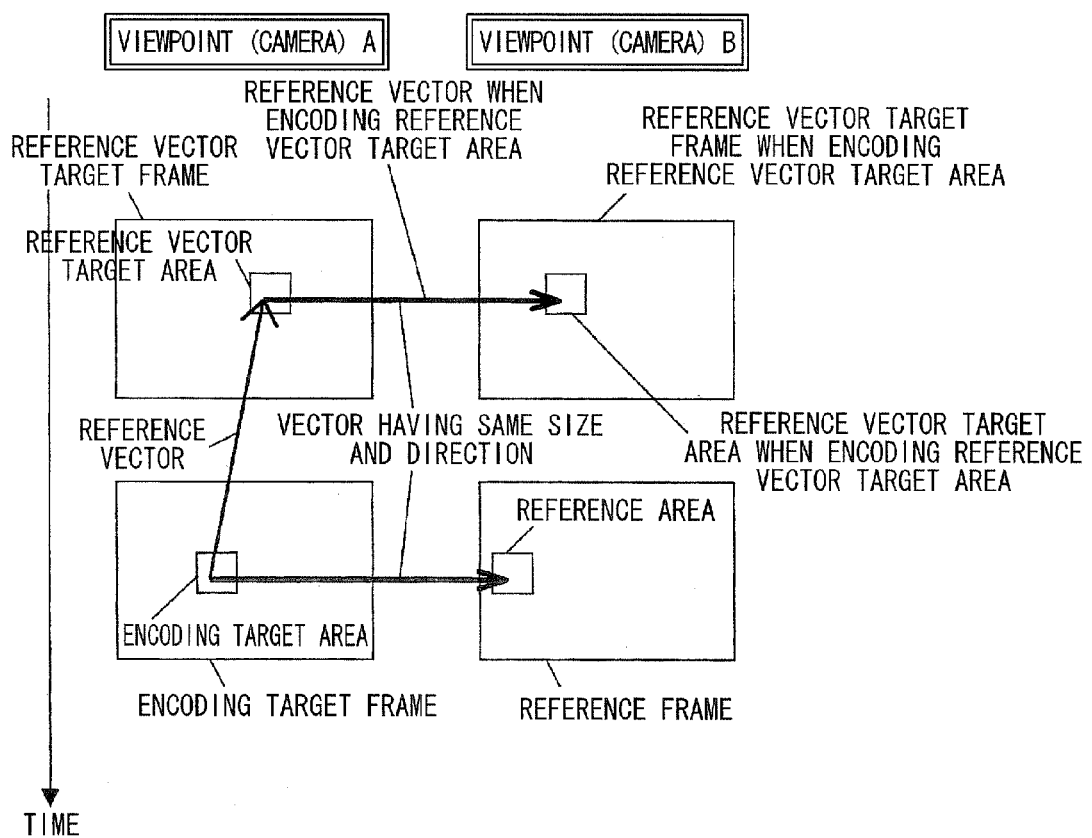
FIG. 3 is a schematic diagram showing an example of the reference area determination method using a reference vector when a reference vector target area was encoded.
Figure 4:
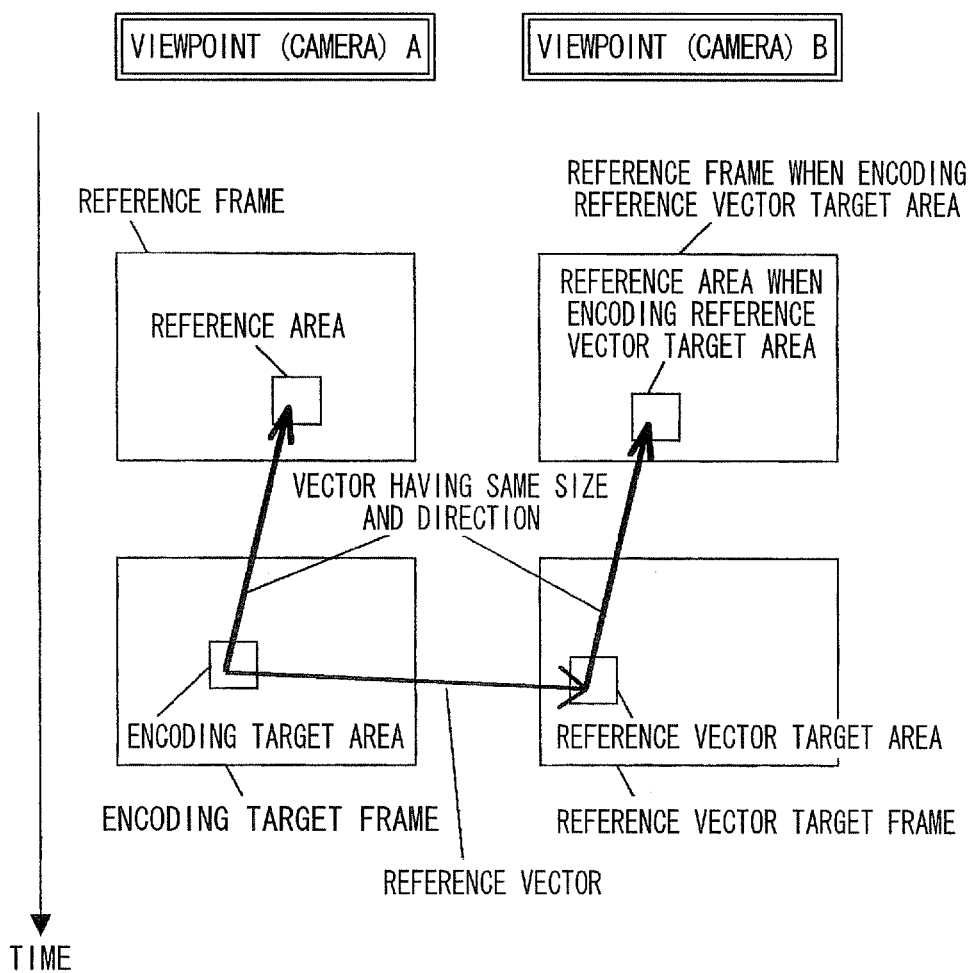
FIG. 4 is a schematic diagram showing an example of the reference area determination method using a vector when a reference vector target area was encoded.
Figure 5:
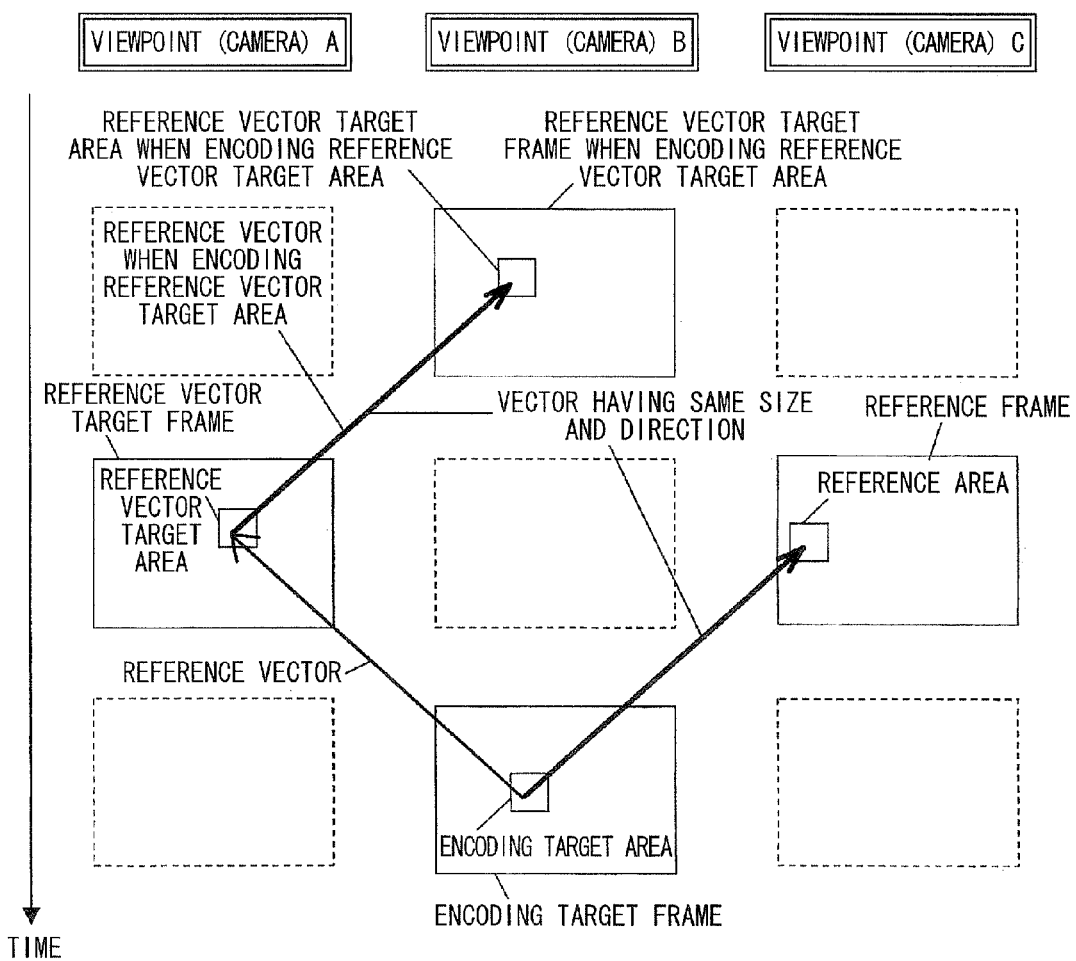
FIG. 5 is a schematic diagram showing an example of the reference area determination method using a reference vector when a reference vector target area was encoded.

FIGS. 3 to 5 show examples of the reference area set by the above-described methods.

In accordance with the methods, a unique reference area can be assigned to the encoding target area in either case of (i)

when corresponding areas have the same camera or time as shown in FIG. 3 or 4, or (ii) when corresponding areas have different cameras and different times as shown in FIG. 5.

In the methods, when corresponding areas have the same camera or time as shown in FIG. 3 or 4, it is assumed that the distance (which causes disparity) from each camera to an imaged object does not considerably change regardless of time, and a reference area suitable for the corresponding area is designated.

In the case of FIG. 5, in addition to that, it is also assumed that the motion of the imaged object continues between the relevant times, so as to designate a reference area suitable for the corresponding area.

The first assumption is actually effective in most cases because a video image which is often seen, such as a multi-viewpoint video image photographing a target object or a scene, is in the assumed state.

The second assumption is not generally effective. However, when the interval between the frames is short, it can be assumed that each object generally performs a linear uniform motion, and thus the second assumption can also be effective in most cases.

However, the latter assumption may be ineffective when the interval between the frames is long, and thus this method may be applied only when corresponding areas have the same camera or time as shown in FIG. 3 or 4, or application of this method may be interrupted when the interval between the frames in the relevant corresponding relationship becomes long.

In the above-described video encoding and decoding methods, the reference area is set using the information when encoding the reference vector target area, so as to reduce the number of execution times of the corresponding-area search.

However, due to an influence of rate-distortion optimization or if the assumed condition is ineffective, the reference area set by such a method may not be the most suitable for generating the predicted image of the encoding target area.

Therefore, in consideration of the characteristic such that even if the reference area deviates from the optimum area, the deviation is not so large, the reference area set by the relevant method may be regarded as a temporary reference area, and only a peripheral area thereof may be subjected to a corresponding-area search so as to improve the possibility of providing an optimum condition for generating the predicted image.

In the relevant methods, with a smaller computation cost than that required for a simple corresponding-area search, a corresponding point having an almost equal quality can be found.

Additionally, instead of directly setting a reference area in the reference frame by using the image information or encoding information of the reference vector target area, it is possible that an already-encoded frame different from the reference vector target frame or the reference frame is set as an intermediate frame; an intermediate area, which is a corresponding area in the intermediate frame, is set using the image information or encoding information of the reference vector target area; and then a corresponding area in the reference frame is set using the image information or encoding information of the intermediate area, so as to use the set area as the reference area.

Generally, in order to detect a corresponding area relating to a change due to disparity between the images of different frames, a narrower search range is required than that required for detecting a corresponding area relating to a temporal change. This is because such an image change due to disparity, which is caused by the arrangement of cameras, appears in a single direction and the amount of change is within a certain limited range.

In particular, when the camera parameters of cameras for obtaining the images are known, the Epipolar geometry constraint is effective, so that an area in an image obtained by one of the cameras is present along a straight line in an image obtained by another one of the cameras. Therefore, it is sufficient to search only a peripheral area of the straight line in consideration of errors in the camera parameters.

However, if both the disparity and time changes are present between the relevant frames, the above-described characteristic is ineffective and a larger range must be searched than that required for detecting only the time change.

However, in the above-described method of an intermediate frame, the set intermediate area makes it possible to search for a corresponding area relating to an image change due to one of the time and inter-camera factors in each of the first and second search steps. Accordingly, a corresponding area can be detected by a lower number of computation times in comparison with the direct reference area detection.

Additionally, the intermediate frame may be a reference vector target frame used when encoding the reference vector target area, or a reference frame used when encoding the reference vector target area. For each case, the intermediate area may be a reference vector target area used when encoding the current reference vector target area, or a reference area used when encoding the reference vector target area.

In the above process, if the intermediate frame is closer to the reference frame in comparison with the reference vector target frame, the search for determining the reference area using the intermediate area can be more easily performed than the search for determining the reference area using the reference vector target area, thereby reducing the amount of computation.

When setting the reference area using the intermediate area, not only the image information and encoding information of the intermediate area, but also the image information and encoding information of the reference vector target area may also be used.

If the set intermediate frame is an already-encoded frame, where the time and viewpoint information relationships between the already-encoded frame and the reference vector target frame are equal to those between the encoding target frame and the reference frame, then the predicted image may be generated using image information of three corresponding areas assigned to the encoding target area, that is, image information of the reference vector target area, image information of the intermediate area, and image information of the reference area.

In order to generate the predicted image using the image information of the three corresponding areas, a method of computing an average or a median value for each pixel may be used.

Additionally, as the reference frame and the encoding target frame have a relationship equal to that between the intermediate frame and the reference vector target frame, it can be assumed that a change between the intermediate area and the reference vector target area also occurs between the reference area and the encoding target area, so as to generate the predicted image in accordance with the following formula.

$$\forall \text{pix}, \text{Pred}[\text{pix}] \text{Ref}[\text{pix}] + \text{RVec}[\text{pix}] - \text{Mid}[\text{pix}] \qquad \text{[Formula 1]}$$

In the above formula, pix indicates the pixel position in the relevant area, Pred indicates the predicted image, Ref indicates the image information of the reference area, RVec indicates the image information of the reference vector target area, and Mid indicates the image information of the intermediate area.

In the above methods, information of a larger number of corresponding areas is used without increasing the amount of information which should be encoded and is used for generating the predicted image. Therefore, it is possible to generate a predicted image close to the image information of the encoding target area.

Although the predicted image can be generated by any method, the same generating method should be used by the encoder and decoder sides.

It is also possible to perform encoding while selecting whether the predicted image is generated using the image information of the reference area, the image information of the reference area and the reference vector target area, or the image information of the reference area, the reference vector target area, and the intermediate area.

In such a case, it is necessary to encode information which indicates that the image information of which area was used for generating the predicted image.

Additionally, information may also be assigned to a method of generating the predicted image by using another area combination, or to each of the predicted image generating methods using the above-described three areas, so as to select the predicted image generating method.

When encoding the information which indicates the predicted image generating method, only the information may be encoded, or the information may be encoded with other information (e.g., reference frame designation information) which should also be encoded.

That is, 0 or 1 may be encoded as the reference frame designation information, and 0, 1, or 2 may be encoded as the information for designating the predicted image generating method; or information which indicates any one of (0,0), (0,1), (0,2), (1,0), (1,1), and (1,2) may be encoded for the combination of both information items.

When the reference vector target area has been encoded without performing interframe video prediction, it represents that no already-encoded frame and no area therein suitable for predicting image information of the reference vector target area can be found.

Therefore, also in the encoding target area corresponding to such a reference vector target area, the possibility that an area in a frame other than the reference vector target frame is selected as the area used for generating the predicted image should be small.

Therefore, when encoding the reference frame designation information, the code corresponding to the information for designating the same frame as the reference vector target frame can be short, so as to reduce the amount of code required for encoding the reference frame designation information.

In addition, the code corresponding to the information for designating a frame which corresponds to the reference frame or the reference vector target frame used when encoding the reference vector target area to which a corresponding relationship has been assigned can also be short so as to further reduce the amount of code required for encoding the reference frame designation information.

That is, the code word table used when encoding the reference frame designation information can be switched using the encoding information of the reference vector target area so as to encode the reference frame designation information with a reduced amount of code.

Similarly, also when encoding the predicted image generating method designation information, the relevant code word table may be switched using the encoding information of the reference vector target area.

Below, the present invention will be explained in detail in accordance with embodiments.

Figure 6:
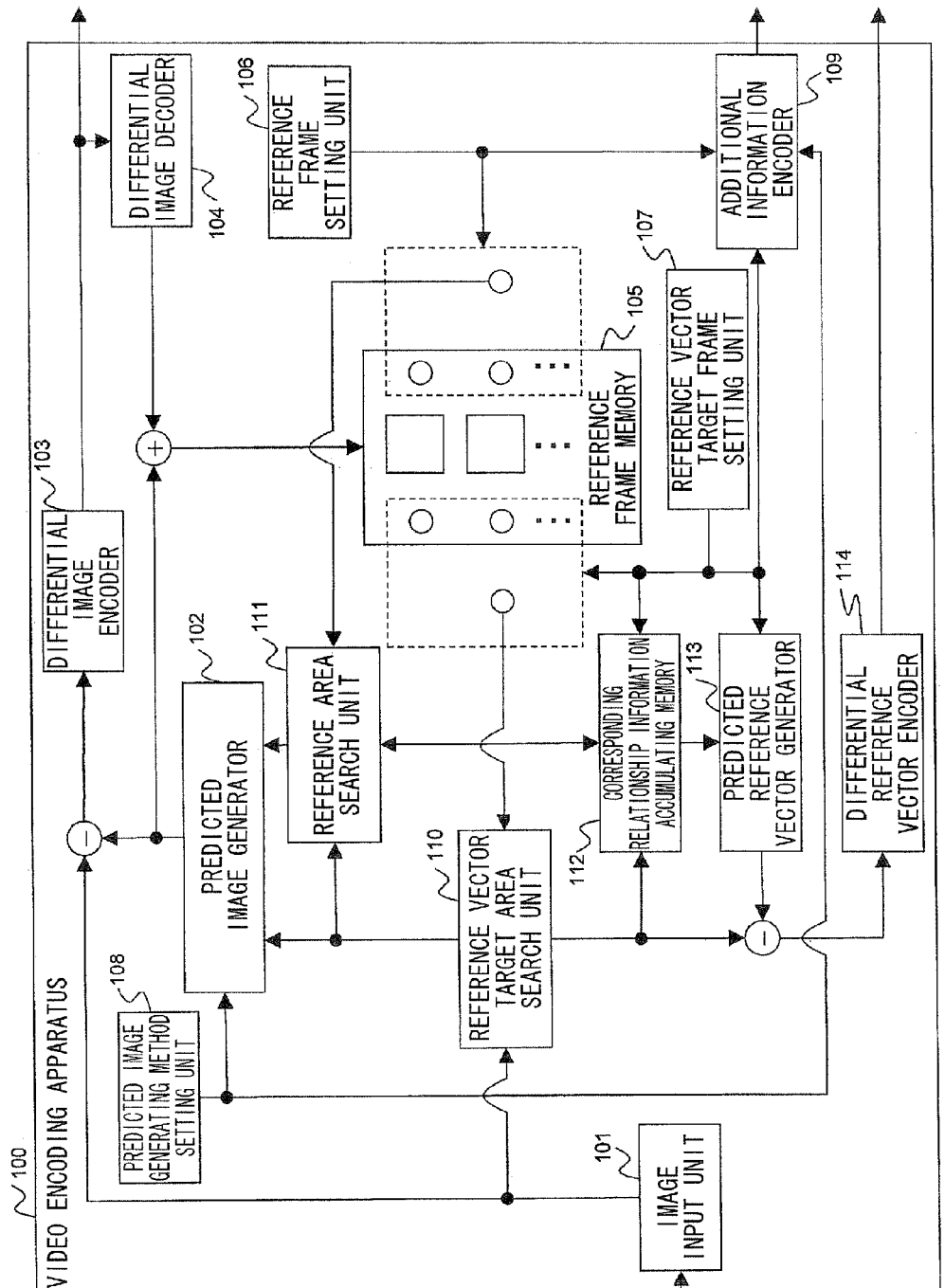
FIG. 6 shows an embodiment of the video encoding apparatus of the present invention.

FIG. 6 shows a video encoding apparatus 100 as an embodiment of the present invention.

The video encoding apparatus 100 includes an image input unit 101 into which an image as an encoding target is input, a predicted image generator 102 that generates a predicted image using an already-encoded image for each area of a divided encoding target image, a differential image encoder 103 that encodes a differential image between the input image and the predicted image, a differential image decoder 104 that decodes encoded data of the differential image, a reference frame memory 105 that accumulates a decoded image of an encoding target area generated by the sum of the decoded differential image and the predicted image, a reference frame setting unit 106 for selecting a reference frame for generating the predicted image, from the reference frame memory 105, a reference vector target frame setting unit 107 for selecting a reference vector target frame as a reference target (frame) of vector information which is to be encoded, from the reference frame memory 105, a predicted image generating method setting unit 108 for setting a predicted image generating method assigned to an obtained corresponding area, an additional information encoder 109 for encoding additional information which consists of reference frame designation information, reference vector target frame designation information, and predicted image generating method designation information, a reference vector target area search unit 110 for obtaining a reference vector by using the input image and the reference vector target frame, a reference area search unit 111 for searching for a reference area by using the image information of the reference vector target area and the reference frame, a corresponding relationship information accumulating memory 112 that stores the set of the reference vector, the reference area, the reference vector target frame, and the reference frame, which was used for the relevant encoding, in association with the encoding target frame and the encoding target area, a predicted reference vector generator 113 for generating a predicted reference vector corresponding to the reference vector of the encoding target area, by using a reference vector which was used when encoding an adjacent area of the encoding target area, and a differential reference vector encoder 114 for encoding a differential reference vector which is the difference between the reference vector and the predicted reference vector.

Figure 7:
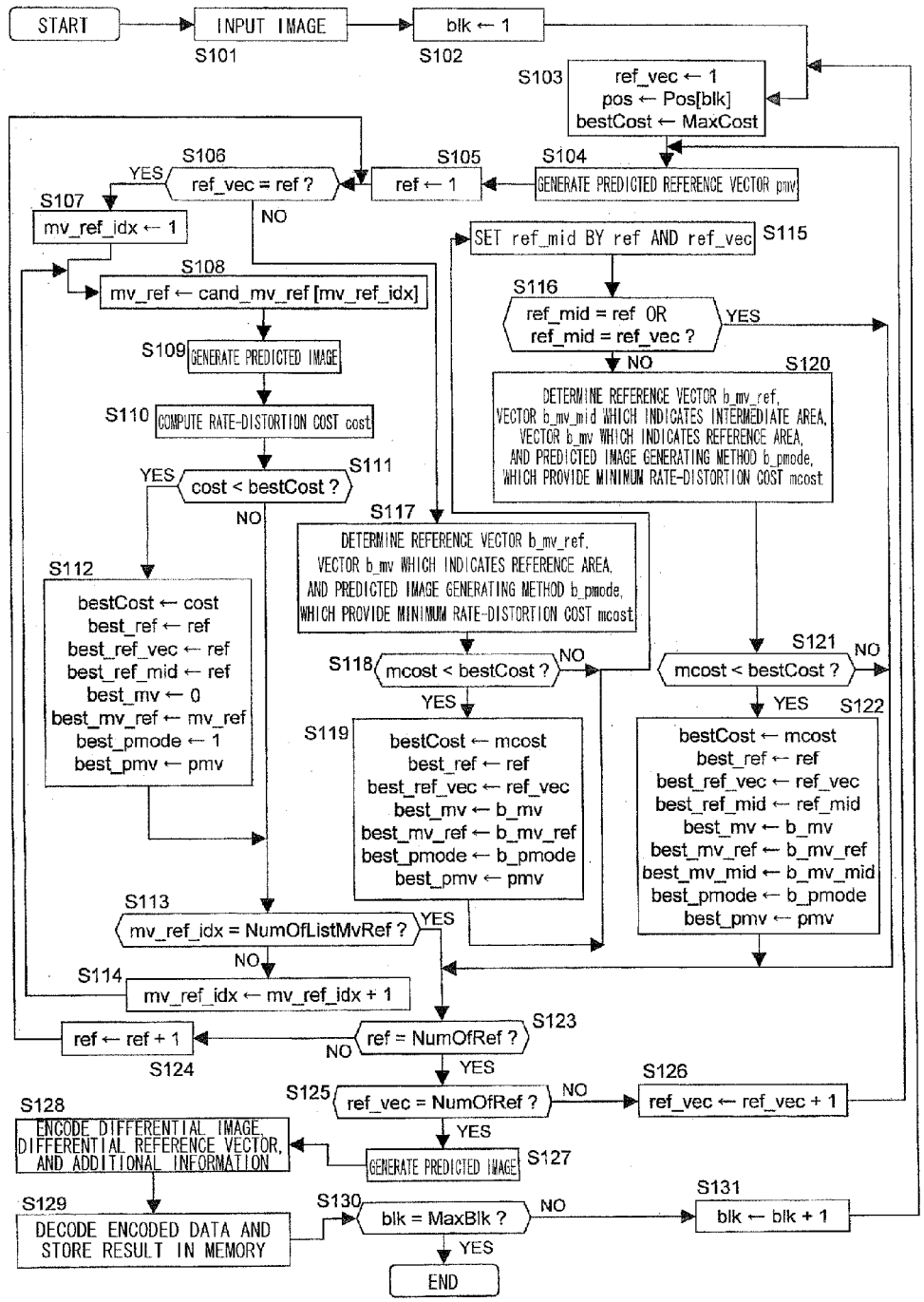
FIG. 7 is an example of the flowchart of the video encoding process executed by the video encoding apparatus of the embodiment.

FIG. 7 shows a flowchart of the video encoding process executed by the video encoding apparatus 100 having the above-described structure.

In each flowchart explained below, a block or frame to which an index is assigned represents a block or frame indicated by the index.

In accordance with the relevant flowchart, the video encoding process executed by the above-configured video encoding apparatus 100 will be explained in detail, where it is assumed that images of a plurality of frames are already encoded, and the results thereof have been stored in the reference frame memory 105 and the corresponding relationship information accumulating memory 112.

Firstly, an image that will become an encoding target is input through the image input unit 101 (S101).

The input encoding target image is entirely divided into areas, and each area is encoded (S102-S131).

In this flowchart, blk indicates an index of a block (area), and MaxBlk indicates the total number of blocks for one image.

After initializing the index blk at 1 (S102), the following processes (S103 to S129) are executed repeatedly while incrementing blk by 1 (S131) until it reaches MaxBlk (S130).

In a process performed for each block, a reference vector target frame best_ref_vec, a reference frame best_ref, and a reference vector best_mv_ref for encoding the block; a vector best_mv which indicates a reference area in the reference frame; a predicted image generating method best_pmode; and a predicted reference vector best_pmv are determined (S113 to S126), and a predicted image for the image information of the encoding target area is generated using the above information (S127). Then additional information consisting of best_ref_vec, best_ref, and best_pmode is encoded in the additional information encoder 109, "best_mv_ref–best_pmv" is encoded by the differential reference vector encoder 114, a differential image between the input image and the predicted image is encoded by the differential image encoder 103, and the relevant encoded data is output (S128).

For the next execution of the encoding process, the encoded data is decoded and a decoded image is stored in the reference frame memory 105. The information relating to corresponding areas (i.e., two areas such as a reference vector target area indicated by best_mv_ref and a reference area indicated by best_mv) used for generating the predicted image is stored in the corresponding relationship information accumulating memory 112 in association with the number of the encoding target frame and the position of the block blk in the relevant image (S129).

That is, when "cur" indicates the index value for indicating the encoding target frame and "pos" indicates the position of the block blk in the relevant image, a set of "cur, pos, best_ref, best_ref_vec, best_mv_ref, and best_mv" is stored in the corresponding relationship information accumulating memory 112.

The predicted image generating process in S127 and the additional information encoding process in S128 will be explained in detail later.

Additionally, information used for generating the predicted image for the encoding is obtained by repeatedly executing the following processes (S104-S124) for all already-encoded frames in the reference frame memory 105, which can be used as a reference vector target frame.

Specifically, after initializing a reference vector target frame index ref_vec at 1 (S102), also initializing a minimum rate-distortion cost bestCost for block blk at an absolutely unattainable maximum value MaxCost, and setting "pos" at a position on the image of block blk (S103), the following processes are executed repeatedly while incrementing ref_vec by 1 (S126) until it reaches the number NumOfRef of frames which are stored in the reference frame memory 105 and can be used (S125). In the repeated processes, a predicted reference vector pmv is generated using the reference vector in an already-encoded block adjacent to block blk (S104), and a combination of a reference vector, a reference frame, a reference area, and a predicted image generating method is determined, which minimizes the rate-distortion cost when a frame indicated by ref_vec is the reference vector target frame (S105-S124).

In this process, the following steps (S106-S122) are repeatedly executed for all already-encoded frames which are stored in the reference frame memory 105 and can be used as the reference frame.

Specifically, after initializing a reference frame index ref at 1 (S105), the following processes are executed repeatedly while incrementing ref by 1 (S124) until it reaches NumOfRef (S123), where in the repeated processes, it is determined that ref_vec coincides with ref (S106), and if it is determined that they coincide with each other, that is, if there is no reference vector target frame substantially (corresponding to a conventional state), then a process of determining a reference vector which provides a minimum rate-distortion cost (S107-S114) is repeatedly performed while the reference frame and the reference vector target frame are indicated by "ref".

In the relevant process, after initializing a reference vector candidate index mv_ref_idx at 1 (S107), the following processes (S108-S112) are executed repeatedly while incrementing mv_ref_idx by 1 (S114) until it reaches the predetermined number NumOfListMvRef of candidates for the reference vector (S113). In the repeated processes, the reference vector corresponding to mv_ref_idx is set as mv_ref (S108), the image information of an area at the position "pos+mv_ref" in frame ref is set as a predicted image Pred[ ] (S109), a rate-distortion cost called simply "cost" is computed (S110), and it is determined whether cost is smaller than bestCost (S111).

When it is determined that cost is smaller than bestCost, bestCost is rewritten as cost, best_ref is rewritten as ref, best_ref_vec is rewritten as ref, best_ref_mid is rewritten as ref, best_mv is rewritten as 0 (zero vector), best_mv_ref is rewritten as mv_ref, best_pmode is rewritten as 1, and best_pmv is rewritten as pmv (S112).

The rate-distortion cost computed in S110 may be obtained by actually encoding the differential image, the differential reference vector "mv_ref–pmv", and the additional information so as to compute the amount of code, and decoding the encoded data so as to compute a quality degradation, thereby performing computation based on the following Formula 2. In another method, a simplified rate-distortion cost may be computed as the rate-distortion cost based on the following Formula 3.

However, a single formula should be used in the process of encoding one block blk.

$$\text{cost} = D_{dec} + \lambda_1 \times \{\text{bit}(\text{mv\_ref} - pmv, ref, ref, 1) + \text{BITS}\} \quad \text{[Formula 2]}$$

$$D_{dec} = \sum_{pix \in \{pixels\ in\ block\ blk\}} |Org[pix] - Dec[pix]|$$

In the above formula, $\lambda_1$ is an undefined Lagrange multiplier, and is a predetermined value. In addition, pix indicates the pixel position, Org[ ] indicates image information of the encoding target area in the input image, and Dec[ ] indicates image information of the decoded image. Additionally, bit (vector, $ref_1$, $ref_2$, mode) is a function which returns the amount of code generated when "vector" as the differential reference vector is encoded, $ref_1$ as the reference vector target frame designation information is encoded, $ref_2$ as the reference frame designation information is encoded, and "mode" as the predicted image generating method designation information is encoded. BITS indicates the amount of code required when encoding differential image Res[ ] (=Org[ ]–Pred[ ]).

$$\text{cost} = D_{pred} + \lambda_2 \times pbit(\text{mv\_ref} - pmv, ref, ref, 1) \quad \text{[Formula 3]}$$

$$D_{pred} = \sum_{pix \in \{pixels\ in\ block\ blk\}} |Org[pix] - Pred[pix]|$$

In the above formula, $\lambda_2$ is an undefined Lagrange multiplier, and is a predetermined value. In addition, pbit(vector, ref$_1$, ref$_2$, mode) is a function which returns the amount of code generated when "vector" as the differential reference vector is encoded, ref$_1$ as the reference vector target frame designation information is encoded, ref$_2$ as the reference frame designation information is encoded, and "mode" as the predicted image generating method designation information is encoded.

If it is determined in the determination of S106 that ref_vec does not coincide with ref (i.e., the reference vector target frame does not coincide with the reference frame), then reference vector b_mv_ref, vector b_mv which indicates the reference area, and predicted image generating method index b_pmode are determined, which provide the minimum rate-distortion cost called "mcost" when the frame indicated by ref is the reference frame and the frame indicated by ref_vec is the reference vector target frame (S117).

The process of S117 will be explained in detail later.

Then it is determined whether or not mcost is smaller than bestCost (S118). When mcost is smaller than bestCost, best-Cost is rewritten as mcost, best_ref is rewritten as ref, best_ref_vec is rewritten as ref_vec, best_mv is rewritten as b_mv, best_mv_ref is rewritten as b_mv_ref, best_pmode is rewritten as b_pmode, and best_pmv is rewritten as pmv (S119).

In contrast, if mcost is larger than bestCost, the process in S119 is omitted.

Next, an already-encoded frame (intermediate frame) is detected where the time and viewpoint relationships between the already-encoded frame and the frame indicated by ref_vec coincide with those between the encoding target frame and the frame indicated by ref, and the index which indicates the already-encoded frame is defined as ref_mid (S115).

If no already-encoded frame which satisfies the above condition is present in the reference frame memory 105, ref_mid is set as ref.

Then it is determined whether ref_mid coincides with ref or ref_vec (S116).

In the determination of S116, if it is determined that ref_mid does not coincide with either of ref and ref_vec, then reference vector b_mv_ref, vector b_mv_mid which indicates the intermediate area, vector b_mv which indicates the reference area, and predicted image generating method index b_pmode are determined, which provide the minimum rate-distortion cost "mcost" when the frame indicated by ref is the reference frame, the frame indicated by ref_vec is the reference vector target frame, and the frame indicated by ref_mid is the intermediate frame (S120).

The process of S120 will be explained in detail later.

Then it is determined whether mcost is smaller than best-Cost (S121). When mcost is smaller than bestCost, bestCost is rewritten as mcost, best_ref is rewritten as ref, best_ref_vec is rewritten as ref_vec, best_ref_mid is rewritten as ref_mid, best_mv is rewritten as b_mv, best_mv_ref is rewritten as b_mv_ref, best_mv_mid is rewritten as b_mv_mid, best_p-mode is rewritten as b_pmode, and best_pmv is rewritten as pmv (S122).

In contrast, if mcost is larger than bestCost, the process in S122 is omitted.

In the determination of S116, if ref_mid coincides with ref or ref_vec, the processes S120 to the above S122 are also omitted.

The reason for that S120 is performed after S117 is that the rate-distortion cost may be reduced when generating the intermediate frame.

Figure 8:
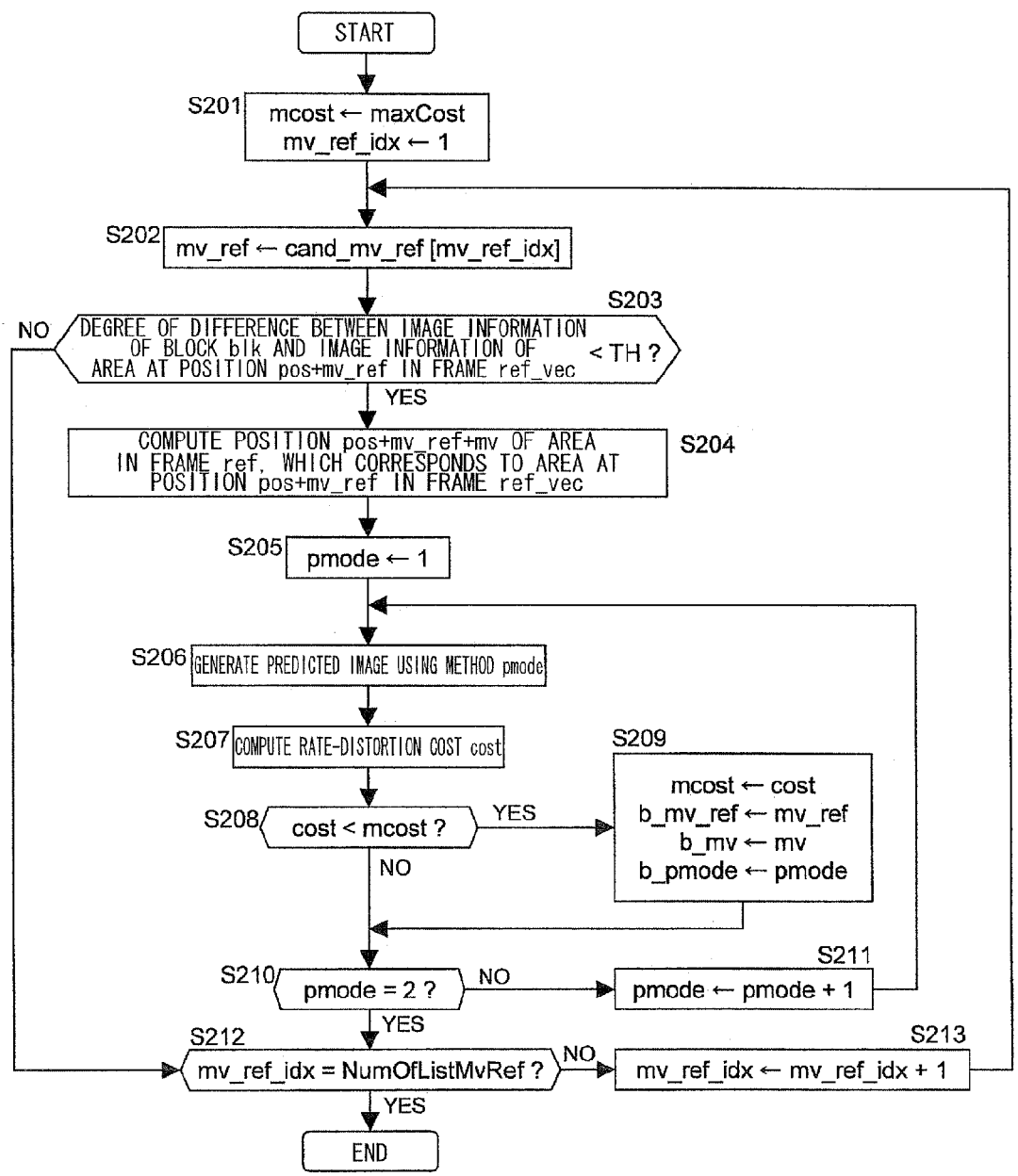
FIG. 8 is an example of the flowchart of the reference area determination process when no intermediate frame is used, in the embodiment.

Next, the process in S117 will be explained in detail with reference to a flowchart shown in FIG. 8.

In this process, while the reference vector is varied, a reference area is assigned to a currently-set reference vector, and a predicted image generating method for providing a rate-distortion cost most suitable therefor is computed.

Specifically, after initializing the reference vector candidate index mv_ref_idx at 1 and also initializing the minimum rate-distortion cost "mcost" at an absolutely unattainable maximum value MaxCost (S201), the following processes (S202-S211) are executed repeatedly while incrementing mv_ref_idx by 1 (S213) until it reaches the assigned number NumOfListMvRef of reference vector candidates (S212).

In the repeated processes (S202-S211), first, a reference vector to which mv_ref_idx is assigned is obtained, and set as mv_ref (S202).

Then, a degree of difference between image information of block blk in the input image and image information of an area at the position "pos+mv_ref" in frame ref_vec is computed, and it is determined whether or not the degree is smaller than a predetermined threshold TH (S203).

The degree of difference between the two image information items may be computed by any method, for example, by computing the sum of absolute differences, the sum of squared differences, or a variance of differences based on the values of corresponding pixels between the relevant two areas, where the threshold TH should be assigned to the employed computing method.

When the degree of difference is larger than or equal to the threshold, it indicates that the image information of the reference vector target area indicated by mv_ref considerably differ from the image information of the encoding target area, and thus the reference vector target area does not correspond to the encoding target area. Therefore, the operation applied to the current mv_ref_idx is terminated.

If it is determined in the determination of S203 that the degree of difference is smaller than the threshold, then an area, which belongs to frame ref and corresponds to the area at the position "pos+mv_ref" in frame ref_vec, is computed, and "mv" is computed for setting the position of the computed area as "pos+mv_ref+mv" (S204). The process of S204 will be explained in detail later.

Then, it is determined whether a predicted image for providing the minimum rate-distortion cost can be generated, by using the image information RVec[ ] of the area at the position "pos+mv_ref" in frame ref_vec and the image information Ref[ ] of the area at the position "pos+mv_ref+mv" in frame ref (S205-S211).

Specifically, after initializing the predicted image generating method index pmode at 1 (S205), the following processes (S206 to S209) are executed repeatedly while incrementing pmode by 1 (S211) until it reaches 2 (S210). In the repeated processes, a predicted image is generated using a predicted image generating method corresponding to pmode (S206), the corresponding rate-distortion cost "cost" is computed (S207), and it is determined whether or not "cost" is smaller than mcost (S208). If it is determined that "cost" is smaller, mcost is rewritten as cost, b_mv_ref is rewritten as mv_ref, b_mv is rewritten as mv, and b_pmode is rewritten as pmode (S209).

The computation of the rate-distortion cost in S207 is performed using a method similar to that used in the above-described step S110.

In the above process, the maximum value of pmode is set as 2. This is because as the predicted image generating method which can be used when two image information items (image information of the reference vector target frame and image information of the reference frame) are obtained, only two methods are considered as candidates, that is, a method of generating a predicted image using only the image information of the reference frame, and a method of generating a predicted image by computing an average of two image information values for each pair of corresponding pixels.

However, the maximum value of pmode may be increased so as to also use another method, for example, for computing the sum of weighted values for the two image information items.

That is, although the predicted image generating methods (pmode=1, 2) are defined here (see Formula 4) for convenience of explanation, another predicted image generating method may be used or added.

$$p\text{mode}=1 \Rightarrow {}^{\forall}\text{pix}, \text{Pred[pix]=Ref[pix]}$$

$$p\text{mode}=2 \Rightarrow {}^{\forall}\text{pix}, \text{Pred[pix]=(Ref[pix]+}R\text{Vec[pix]+} 1)/2$$ [Formula 4]

In the present embodiment, a method of generating a predicted image by using only the image information of the reference vector target frame is not employed as a candidate. This is because such a method corresponds to a predicted image generating method when the reference vector target frame is equal to the reference frame.

Figure 9:
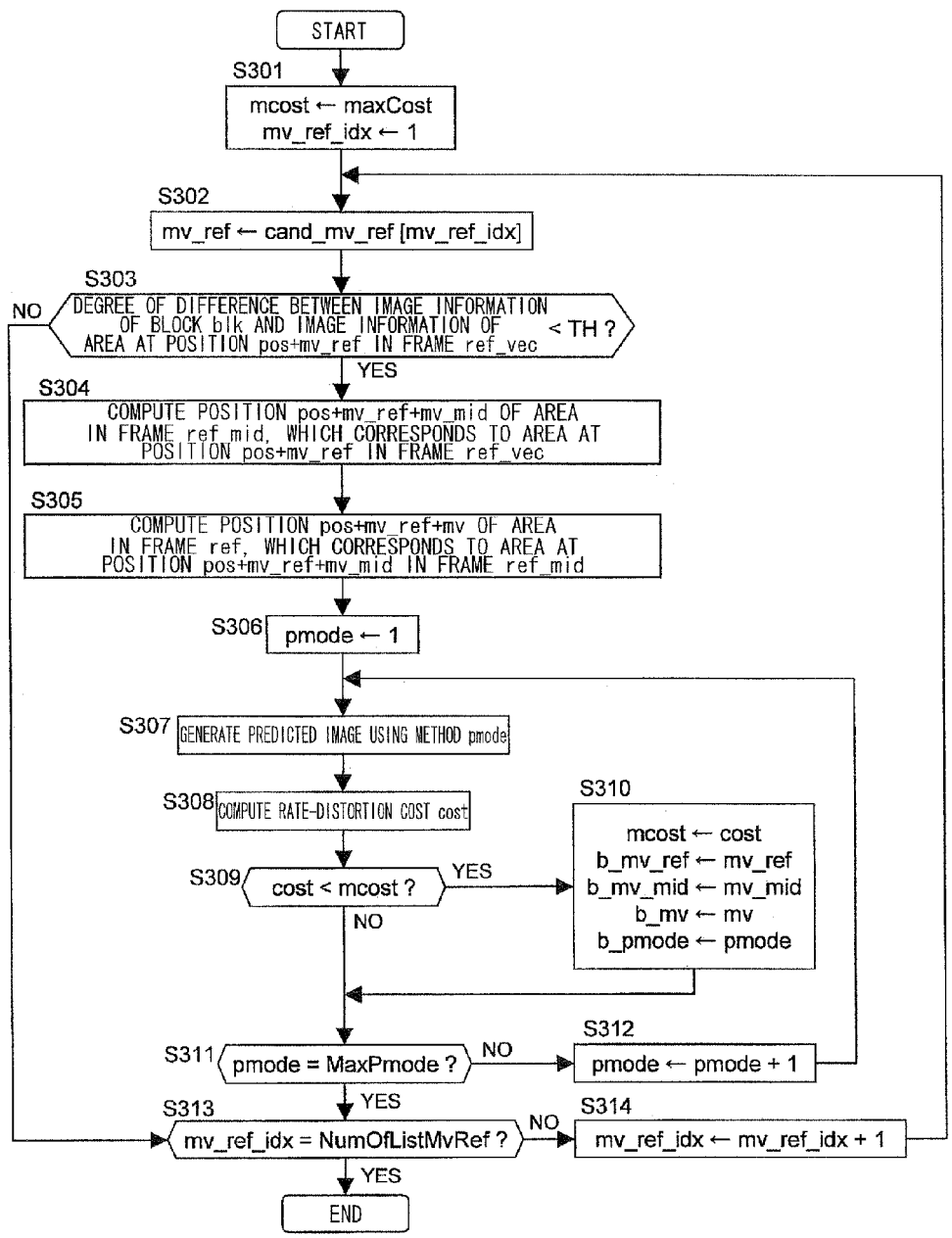
FIG. 9 is an example of the flowchart of the reference area determination process when an intermediate frame is used, in the embodiment.

Next, the process in S117 will be explained in detail with reference to a flowchart shown in FIG. 9.

In this process, while the reference vector is varied, a reference area and an intermediate area are assigned to a currently-set reference vector, and a predicted image generating method for providing a rate-distortion cost most suitable therefor is computed.

Specifically, after initializing the reference vector candidate index mv_ref_idx at 1 and also initializing the minimum rate-distortion cost "mcost" at an absolutely unattainable maximum value MaxCost (S301), the following processes (S202-S211) are executed repeatedly while incrementing mv_ref_idx by 1 (S314) until it reaches the assigned number NumOfListMvRef of reference vector candidates (S313).

In the repeated processes (S302-S312), first, a reference vector to which mv_ref_idx is assigned is obtained, and set as mv_ref (S302).

Then, a degree of difference between image information of block blk in the input image and image information of an area at the position "pos+mv_ref" in frame ref_vec is computed, and it is determined whether or not the degree is smaller than a predetermined threshold TH (S303).

The relevant process is similar to that in S203, and the degree of difference can be computed as computed in S203.

When the degree of difference is larger than or equal to the threshold, it indicates that the image information of the reference vector target area indicated by mv_ref considerably differ from the image information of the encoding target area, and thus the reference vector target area does not correspond to the encoding target area. Therefore, the operation applied to the current mv_ref_idx is terminated.

If it is determined in the determination of S303 that the degree of difference is smaller than the threshold, then an area, which belongs to frame ref_mid and corresponds to the area at the position "pos+mv_ref" in frame ref_vec, is computed, and "mv_mid" is computed for setting the position of the computed area as "pos+mv_ref+mv_mid" (S304).

Then, an area, which belongs to frame ref and corresponds to the area at the position "pos+mv_ref+mv_mid" in frame ref_mid, is computed, and "mv" is computed for setting the position of the computed area as "pos+mv_ref+mv" (S305). The processes of S304 and S305 will be explained in detail later.

In the process of S305, when determining the area in frame ref, instead of the area at the position "pos+mv_ref+mv_mid" in frame ref_mid, the area at the position "pos+mv_ref" in frame ref_vec may be used as the corresponding base area.

In such a case, image information used as a template does not change, and thus it is possible to prevent an error accumulation due to corresponding-area computation, which may provide a corresponding area having image information that does not close to the image information of the encoding target area.

Then, it is determined whether or not a predicted image for providing the minimum rate-distortion cost can be generated, by using the image information RVec[ ] of the area at the position "pos+mv_ref" in frame ref_vec, the image information Mid[ ] of the area at the position "pos+mv_ref+mv_mid" in frame ref_mid, and the image information Ref[ ] of the area at the position "pos+mv_ref+mv" in frame ref (S306-S312).

Specifically, after initializing the predicted image generating method index pmode at 1 (S306), the following processes (S307 to S310) are executed repeatedly while incrementing pmode by 1 (S312) until it reaches the number MaxPmode of the predicted image generating methods (S311). In the repeated processes, a predicted image is generated using a predicted image generating method corresponding to pmode (S307), the corresponding rate-distortion cost "cost" is computed (S308), and it is determined whether or not "cost" is smaller than mcost (S309). If it is determined that "cost" is smaller than mcost, mcost is rewritten as cost, b_mv_ref is rewritten as mv_ref, b_mv_mid is rewritten as mv_mid, b_mv is rewritten as mv, and b_pmode is rewritten as pmode (S310).

The computation of the rate-distortion cost in S308 is performed using a method similar to that used in the above-described step S110.

In the above process, as the predicted image generating method which can be used when three image information items (image information of the reference vector target frame, image information of the reference frame, and image information of the intermediate frame) are obtained, in addition to the methods represented by Formula 4, other three methods are available, that is, a method of generating a predicted image by computing an average of three image information values for each set of corresponding pixels, a method of generating a predicted image by computing a median value of three image information values for each set of corresponding pixels, and a method of generating a predicted image with a assumption such that a change between the intermediate area and the reference vector target area also occurs between the reference area and the encoding target area.

The three predicted image generating methods can be represented by Formula 5 below. For convenience of explanation, the three methods correspond to "pmode=3, 4, 5". However, another value of pmode may be assigned to another method, or the order of value assignment of pmode may be changed.

$$p\text{mode}=3 \Rightarrow {}^{\forall}\text{pix}, \text{Pred[pix]=(Ref[pix]+RVec[pix]+Mid[pix]+1)/3}$$

$$p\text{mode}=4 \Rightarrow {}^{\forall}\text{pix}, \text{Pred[pix]=Median(Ref[pix],RVec[pix],Mid[pix])}$$

$$p\text{mode}=5 \Rightarrow {}^{\forall}\text{pix}, \text{Pred[pix]=Ref[pix]+RVec[pix]-Mid[pix]}$$ [Formula 5]

For the prediction of pmode=5, a higher prediction accuracy can be obtained when the process of S305 is executed exactly as written in the flowchart because the assumed state is more often realized.

In contrast, for the prediction of pmode=4, a higher prediction accuracy can be obtained when the process of S305 is not executed exactly as written, but executed by determining the area in frame ref by using, as described above, the area (as the corresponding base area) at the position "pos+mv_ref" in frame ref_vec, instead of the area at the position "pos+mv_ref+mv_mid" in frame ref_mid, so as to reduce an error accumulation.

Therefore, S305 of the relevant flowchart may employ a method of selecting whether the area at the position "pos+mv_ref+mv_mid" in frame ref_mid or the area at the position "pos+mv_ref" in frame ref_vec is used, in accordance with pmode.

Figure 10:
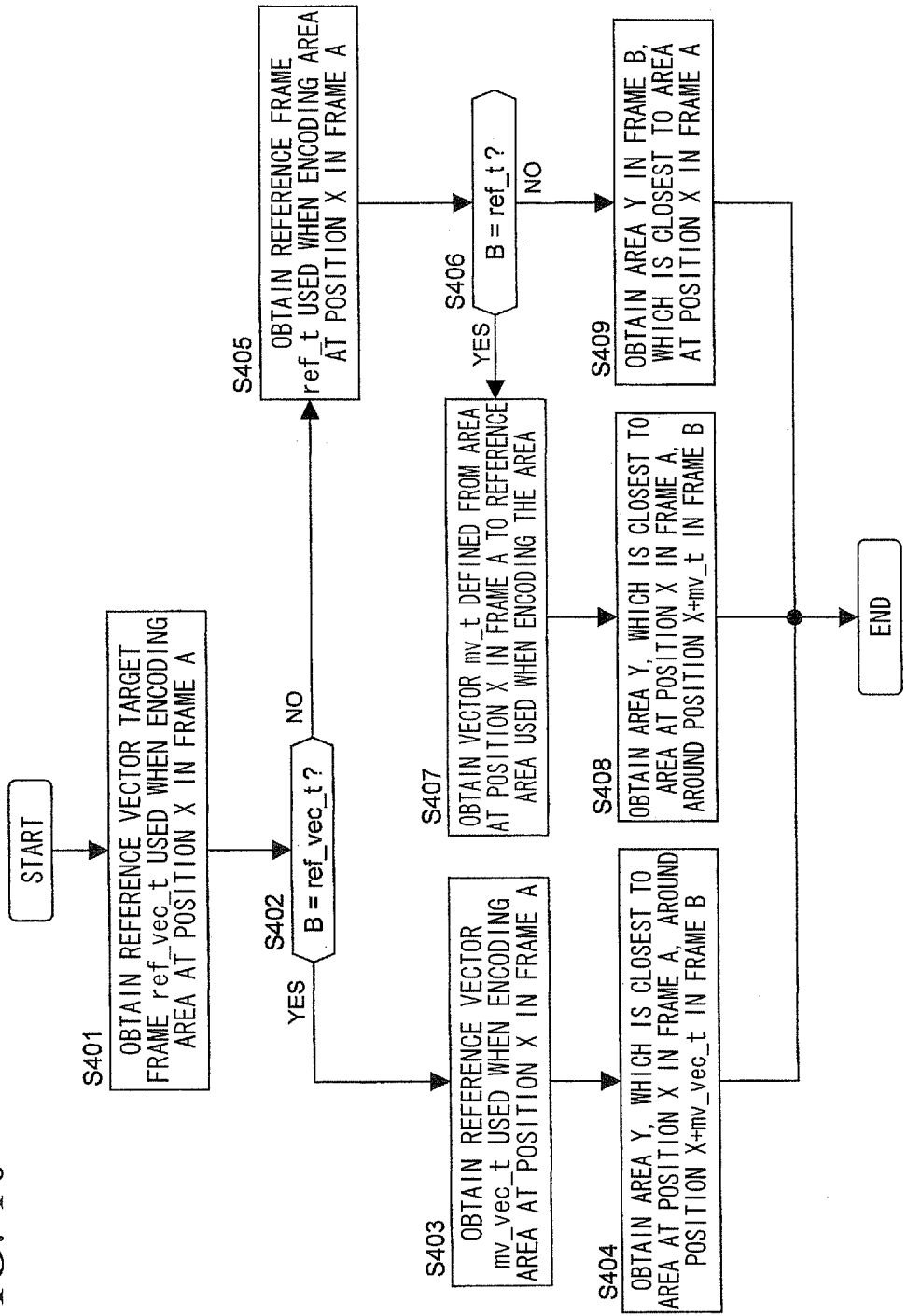
FIG. 10 is an example of the flowchart of the corresponding area search process in the embodiment.

Next, with reference to a flowchart shown in FIG. 10, the processes in the above-described steps S204, S304, and S305 will be explained in detail.

In this flowchart, the processes in S204, S304, and S305 are generalized, and a process of computing an area Y which belongs to frame B and corresponds to the area at position X in frame A is shown.

Here, for mv or mv_mid determined in S204, S304, and S305, a required value is computed using the position Y in each case. Below, the area at position X in frame A is simply called "area AX".

First, the index of the reference vector target frame used when encoding area AX is retrieved from the corresponding relationship information accumulating memory 112, and is set as ref_vec_t (S401).

In this process, one reference vector target frame used when encoding area AX cannot be specified if, for example, area AX does not coincide with the unit block for encoding.

In such a case, among a plurality of reference vector target frames, the index of a reference vector target frame which is used by the largest part within area AX is set as ref_vec_t.

In addition, if no reference vector target frame is present, ref_vec_t is set at an absolutely unattainable value.

Next, it is determined whether the obtained ref_vec_t coincides with B (S402).

If it is determined that they coincide with each other, reference vector mv_vec_t used when encoding area AX is obtained (S403).

In this process, one reference vector used when encoding area AX cannot be specified if, for example, area AX does not coincide with the unit block for encoding.

In such a case, among reference vectors of areas in the reference vector target frame indicated by ref_vec_t, a reference vector which is used by the largest area is set as mv_vec_t.

Here, instead of simply selecting a reference vector used by the largest area, one may be selected using an average or median value computed by means of weighting in accordance with the size of each area, or an average or median value computed without such weighting.

After mv_vec_t is computed, area Y having image information close to that of area AX is detected around position "X+mv_vec_t" in frame B (S404).

In order to reduce the amount of search computation, position "X+mv_vec_t" may be replaced with Y. This is because the area indicated by "X+mv_vec_t" was referred to when encoding area AX, and thus has image information passably close to that of area AX. In such a case, suitability of the relevant corresponding relationship does not considerably degrade.

In contrast, if it is determined in the determination of S402 that ref_vec_t and B do not coincide with each other, the index of the reference frame used when encoding area AX is retrieved from the corresponding relationship information accumulating memory 112, and set as ref_t (S405).

In this process, similar to the process of S401, a plurality of reference frames may be obtained. In such a case, one ref_t is determined using a method similar to that explained in the above-described step S401.

Then, it is determined whether or not ref_t and B coincide with each other (S406).

When it is determined that they coincide with each other, then vector mv_t defined from position X to the reference area, which was used when encoding area AX, is retrieved from the corresponding relationship information accumulating memory 112 (S407).

If a plurality of vectors mv_t are obtained for area AX, one mv_t is determined in accordance with a method as explained in the above-described step S403.

After mv_t is obtained, area Y having image information close to that of area AX is detected around position "X+mv_t" in frame B (S408).

As described in the above-described step S404, position "X+mv_t" may be replaced with Y in order to reduce the amount of search computation.

In contrast, if it is determined in the determination of S406 that ref_t does not coincide with B, then area Y which belongs to frame B and has image information close to that of area AX is obtained by means of an ordinary search method such as block matching (S409).

Next, the predicted image generating process in S127 will be explained in detail.

The predicted image is generated by the following Procedure 1 in accordance with pos, best_ref, best_ref_vec, best_ref_mid, best_mv, best_mv_ref, best_mv_mid, and best_pmode, which were obtained through the processes before S127.

Procedure 1

1. Image information RVec[ ] of the area at the position "pos+best_mv_ref" in frame best_ref_vec is retrieved from the reference frame memory 105.
2. If best_ref coincides with best_ref_vec, the operation proceeds to 6.
3. Image information Ref[ ] of the area at the position "pos+best_mv_ref+best_mv" in frame best_ref is retrieved from the reference frame memory 105.
4. If best_ref_mid coincides with best_ref, the operation proceeds to 6.
5. Image information Mid[ ] of the area at the position "pos+best_mv_ref+best_mv_mid" in frame best_ref_mid is retrieved from the reference frame memory 105.
6. The predicted image Pred[ ] is generated using Formula 4 or 5 in accordance with the value of pmode.

In addition, another predicted image generating method may be assigned to pmode and employed.

Next, the additional information encoding process in S128 will be explained in detail.

Here, the additional information corresponds to best_ref, best_ref_vec, and best_pmode. Before encoding the additional information, the differential reference vector is encoded.

First, reference vector target frame best_ref_vec is encoded.

It is highly possible that the selected best_ref_vec is a frame which has been encoded as best_ref_vec in an adjacent area of block blk, or corresponds to a frame adjacent to the encoding target frame. Therefore, the code word table is switched so that the frame indexes of such frames can be encoded with a smaller amount of code in comparison with encoding of the frame indexes assigned to the other frames.

Accordingly, encoding can be performed with a smaller amount of code in comparison with a case in that every frame requires the same amount of code.

Then, the reference frame best_ref is encoded.

Here, the code word table is switched using the already-encoded best_ref_vec and the reference vector which can be generated using a differential reference vector which was also encoded separately.

That is, by using encoding information of the reference vector target area which belongs to the reference vector target frame best_ref_vec and is indicated by the reference vector, the code word table is switched so that a short-length code word is assigned to a frame index which should appear highly frequently.

For example, if intra encoding is most frequently used in the reference vector target area although the reference vector target frame best_ref_vec is not "I frame", it represents that there is no area in another frame, which has image information close to that of the reference vector target area. Therefore, it is highly possible that best_ref becomes equal to best_ref_vec. In such a case, a short-length code word is assigned to the same frame index as best_ref_vec.

Similarly, for a frame used as the reference frame or the reference vector target frame when encoding the reference vector target area, the wider the used part of the relevant frame, the higher the probability that the relevant frame is selected as best_ref. Therefore, a code word is assigned to the frame in accordance with the rank of the probability.

Accordingly, encoding can be performed with a smaller amount of code in comparison with a case in that a code word having the same length is assigned to every index.

Finally, best_pmode is encoded. The code word table is switched using the already-encoded best_ref_vec and best_ref, and frame information in the reference frame memory 105.

For example, if best_ref_vec and best_ref coincide with each other, it represents that only one corresponding area can be obtained for block blk, and thus pmode value other than 1 is meaningless. In such a case, the amount of code can be reduced by setting a code word table for omitting the encoding itself of pmode.

In contrast, if best_ref_vec and best_ref do not coincide with each other, the possibility that 1 is selected as pmode should be very low. Therefore, the code word table is switched so that a short-length code word is assigned to each pmode value other than 1, thereby performing encoding with a smaller amount of code in comparison with a case in that a code word having the same length is assigned to every predicted image generating method.

Additionally, if only two frames are stored in the reference frame memory, or if no appropriate intermediate frame for the combination of best_ref_vec and best_ref is stored in the reference frame memory 105, then no predicted image generating method which requires three corresponding areas cannot be used. Therefore, the code word table may be switched so that a short-length code word is assigned to the other predicted image generating methods, thereby performing encoding with a smaller amount of code in comparison with a case in that a code word having the same length is assigned to every predicted image generating method.

As described above, the items of additional information may be individually encoded, or a number may be assigned to each combination thereof so as to encode the number.

Therefore, if two images (whose indexes are 1 and 2) are stored in the reference frame memory, and five types of the predicted image generating method are usable, then the set of {best_ref, best_ref_vec, best_pmode} has 20 value combinations such as {1,1,1}, {1,1,2}, {1,1,3}, {1,1,4}, {1,1,5}, {1,2,1}, {1,2,2}, {1,2,3}, {1,2,4}, {1,2,5}, {2,1,1}, {2,1,2}, {2,1,3}, {2,1,4}, {2,1,5}, {2,2,1}, {2,2,2}, {2,2,3}, {2,2,4}, and {2,2,5}.

To the 20 combinations, numbers 1 to 20 may be assigned and encoded.

However, some of the combinations are actually meaningless.

For example, when best_ref and best_ref_vec have the same value, only one corresponding area can be obtained for the encoding target area, and thus "pmode=2 to 5" is impossible.

Therefore, only 12 combinations such as {1,1,1}, {1,2,1}, {1,2,2}, {1,2,3}, {1,2,4}, {1,2,5}, {2,1,1}, {2,1,2}, {2,1,3}, {2,1,4}, {2,1,5}, and {2,2,1} are effective, and one of the numbers 1 to 12 should be encoded.

Additionally, if the reference frame memory includes only two images, no frame can be selected as an intermediate frame, and thus each pmode value which requires three corresponding areas is meaningless. Therefore, effective combinations are further reduced, and only 6 combinations such as {1,1,1}, {1,2,1}, {1,2,2}, {2,1,1}, {2,1,2}, and {2,2,1} are effective. In such a case, one of the numbers 1 to 6 should be encoded.

Even when three or more images are stored in the reference frame memory, in the present embodiment, no appropriate intermediate frame may be present depending on the combination of best_ref and best_ref_vec, and it may be impossible to perform the predicted image generating method which requires three corresponding areas. Even in such a case, a method of assigning no code to each ineffective combination may be employed.

Additionally, instead of encoding all three information items, specific two of them may be combined and encoded.

For example, best_ref_vec may be individually encoded while best_ref and pmode may be combined so as to encode them using one code word. In such a case, an encoding method by switching the code word table for {best_ref, pmode} in accordance with encoded data of a reference vector target area (which is obtained using best_ref_vec and a reference vector which has been separately encoded) can be easily inferred.

Figure 11:
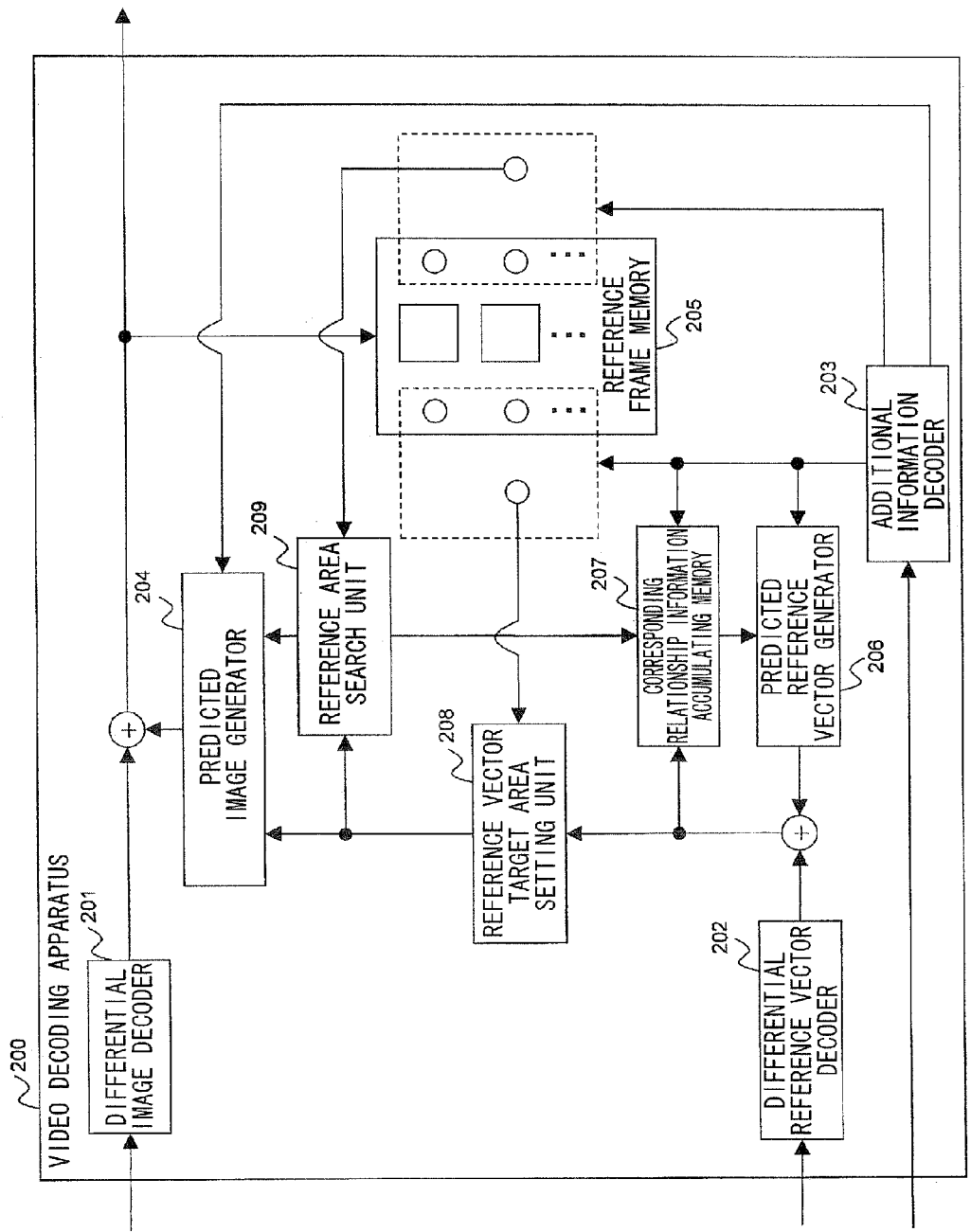
FIG. 11 shows an embodiment of the video decoding apparatus of the present invention.

FIG. 11 shows a video decoding apparatus 200 as an embodiment of the present invention.

The video decoding apparatus 200 includes a differential image decoder 201 that decodes encoded data of a differential image with respect to a predicted image of an image that becomes a decoding target, a differential reference vector decoder 202 that decodes encoded data of a differential reference vector as the difference between a reference vector, which is necessary for generating a predicted image, and a predicted reference vector, an additional information decoder 203 that decodes encoded data of additional information consisting of reference vector target frame designation information, reference frame designation information, and predicted image generating method designation information, which are necessary for generating the predicted image, a predicted image generator 204 that generates a predicted image of a decoding target area in accordance with provided information, a reference frame memory 205 that accumulates a decoded image determined from the sum of a predicted image and a decoded differential image, a predicted reference vector generator 206 that generates a predicted reference vector as a predicted vector of the reference vector used in the decoding target area, based on vector information which was used in an area adjacent to the decoding target area, a corresponding relationship information accumulating memory 207 that stores the set of the reference vector, the reference area, the reference vector target frame, and the reference frame, which was used for the relevant decoding, in association with the decoding target frame and the decoding target area, a reference vector target area setting unit 208 for setting a reference vector target area which belongs to the reference vector target frame and is indicated by the reference vector determined by the sum of the predicted reference vector and the decoded differential reference vector, and a reference area search unit 209 for searching for a reference area by using the image information of the reference vector target area and the reference frame.

Figure 12:
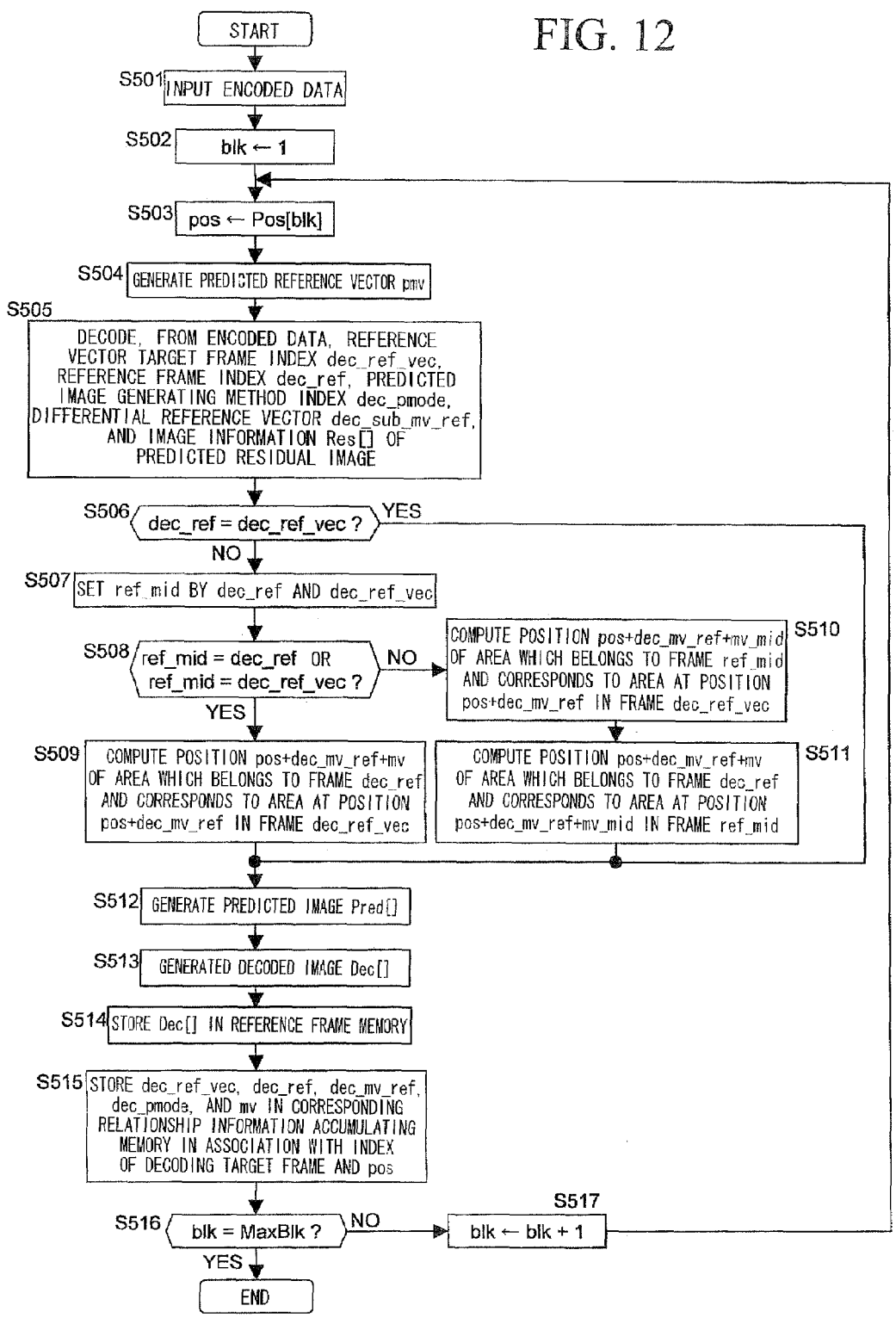
FIG. 12 is an example of the flowchart of the video decoding process executed by the video decoding apparatus of the embodiment.
Figure 13A:
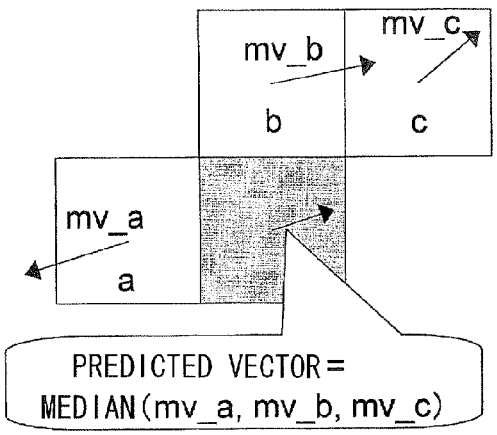
FIG. 13A is a schematic diagram explaining motion vector prediction in H.264.
Figure 13B:
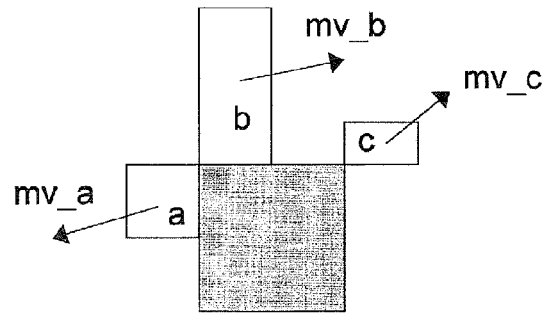
FIG. 13B is also a schematic diagram explaining the motion vector prediction in H.264.
Figure 13C:
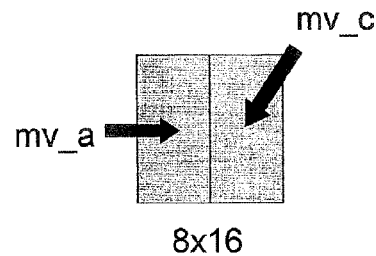
FIG. 13C is also a schematic diagram explaining the motion vector prediction in H.264.
Figure 13D:
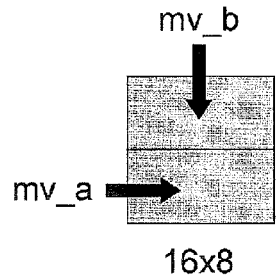
FIG. 13D is also a schematic diagram explaining the motion vector prediction in H.264.
Figure 14:
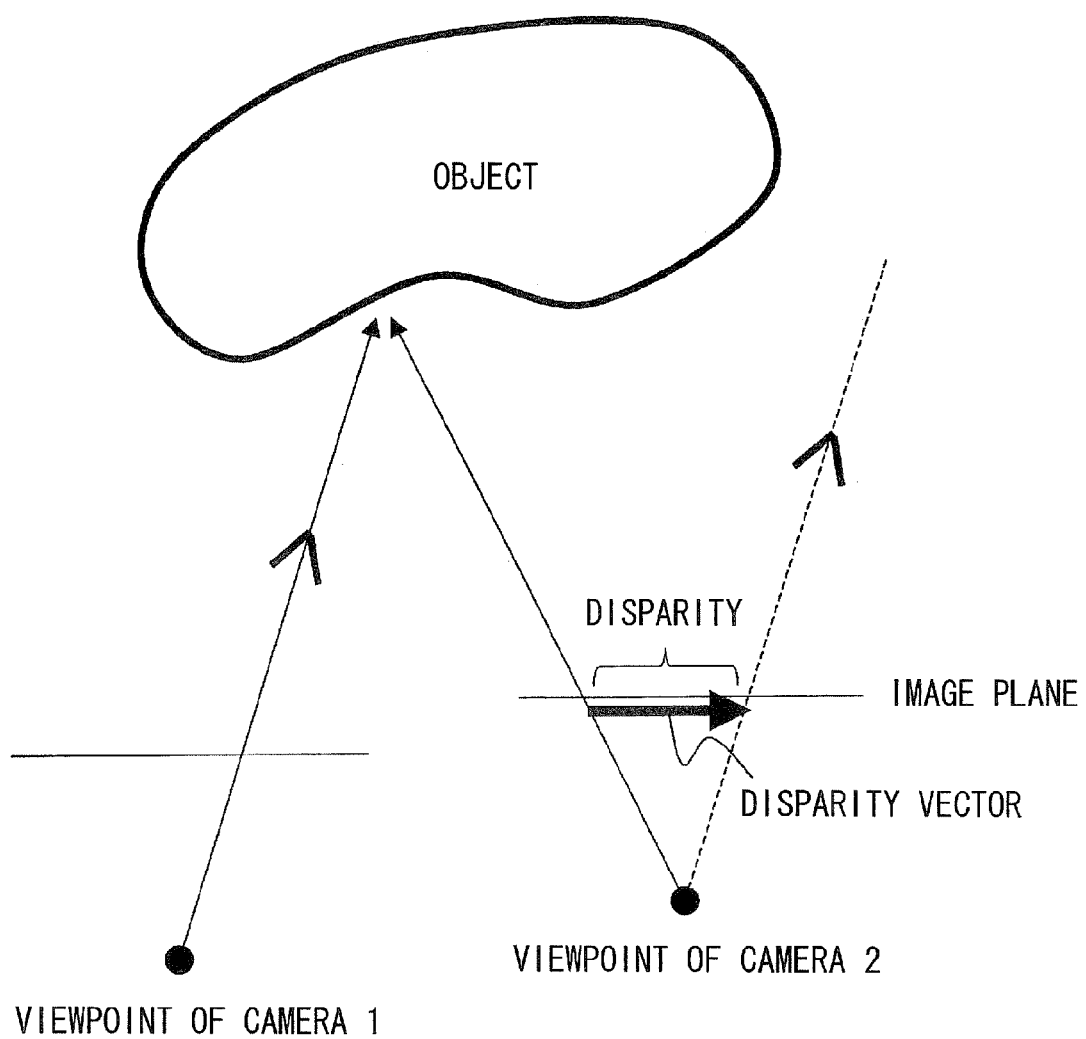
FIG. 14 is a schematic diagram showing disparity generated between cameras.

FIG. 12 shows a flowchart of the video decoding process executed by the video decoding apparatus 200 having the above-described structure.

In accordance with the relevant flowchart, the video decoding process executed by the above-configured video decoding apparatus 200 will be explained in detail, where it is assumed that images of a plurality of frames are already decoded, and the results thereof have been stored in the reference frame memory 205 and the corresponding relationship information accumulating memory 207.

Firstly, encoded data of a differential image, encoded data of the differential reference vector, and encoded data of the additional information are input to the video decoding apparatus 200, and sent respectively to the differential image decoder 201, the differential reference vector decoder 202, and the additional information decoder 203 (S501).

The decoding target image is entirely divided into areas, and each area is decoded (S502 to S517).

In this flowchart, blk indicates an index of a block (area), and MaxBlk indicates the total number of blocks in one image. Specifically, after initializing the index blk at 1 (S502), the following processes (S503 to S515) are repeatedly executed while incrementing blk by 1 (S517) until it reaches MaxBlk (S516), so as to decode the relevant image.

In a process performed in each block, the position of block blk is stored as "pos" (S503), and predicted reference vector "pmv" is generated using, for example, a reference vector which is stored in the corresponding relationship information accumulating memory 207 and was used in a peripheral block around block blk (S504).

Next, from the encoded data, reference vector target frame index dec_ref_vec, reference frame index dec_ref, predicted image generating method index dec_pmode, differential reference vector dec_sub_mv_ref, and image information Res[ ] of a predicted residual image for block blk are decoded; the reference vector dec_mv_ref is obtained by computing "pmv+dec_sub_mv_ref": and mv is initialized at zero vector (S505).

Then it is determined whether dec_ref coincides with dec_ref_vec (S506). If it is determined that they coincide with each other, predicted image Pred[ ] is generated (S512).

The predicted image generating process performed here is performed in accordance with the above-described Procedure 1 while best_ref is regarded as dec_ref, best_ref_vec is regarded as dec_ref_vec, best_mv_ref is regarded as dec_mv_ref, best_pmode is regarded as dec_pmode, best_ref_mid is regarded as ref_mid, best_mv_mid is regarded as mv_mid, and best_mv is regarded as mv in Procedure 1.

In contrast, if it is determined in the determination of S506 that dec_ref does not coincide with dec_ref_vec, then an already-decoded frame is detected where the time and viewpoint relationships between the already-decoded frame and the frame indicated by dec_ref_vec coincide with those between the decoding target frame and the frame indicated by dec_ref, and the index which indicates the already-decoded frame is defined as ref_mid (S507).

If no already-decoded frame which satisfies the above condition is present in the reference frame memory 205, ref_mid is set as dec_ref.

Then it is determined whether or not ref_mid coincides with dec_ref or dec_ref_vec (S508).

If it is determined that they coincide with each other, an area, which belongs to frame dec_ref and corresponds to the area at the position "pos+dec_mv_ref" in frame dec_ref_vec, is computed, and "mv" is computed for setting the position of the computed area as "pos+dec_mv_ref+mv" (S509).

This process is equal to that performed in the above-described step S204 except that the names of some variables are different between the steps.

In contrast, if it is determined in the determination of S508 that ref_mid does not coincide with either dec_ref or dec_ref_vec, then firstly, an area, which belongs to frame ref_mid and corresponds to the area at the position "pos+dec_mv_ref" in frame dec_ref_vec, is computed, and "mv_mid" is computed for setting the position of the computed area as "pos+dec_mv_ref+mv_mid" (S510).

Secondly, an area, which belongs to frame dec_ref and corresponds to the area at the position "pos+dec_mv_ref+mv_mid" in frame ref_mid, is computed, and "mv" is computed for setting the position of the computed area as "pos+dec_mv_ref+mv" (S3511).

The above process is equal to that performed in the above-described steps S304 and S305 except that the names of some variables are different between the corresponding steps.

After the process of S509 or S511 is completed, predicted image Pred[ ] is generated using the obtained information (S512).

As described above, the predicted image generating process performed here is executed in accordance with the above-described Procedure 1 while best_ref is regarded as dec_ref, best_ref_vec is regarded as dec_ref_vec, best_mv_ref is regarded as dec_mv_ref, best_pmode is regarded as dec_pmode, best_ref_mid is regarded as ref_mid, best_mv_mid is regarded as mv_mid, and best_mv is regarded as mv in Procedure 1.

After predicted image Pred[ ] is generated, the pixel values of Pred[ ] and Res[ ] are added to each other for each pixel, so that decoded image Dec[ ] is generated (S513). The generated Dec[ ] is output and simultaneously stored in the reference frame memory 205 (S514).

In addition, dec_ref_vec, dec_ref, dec_mv_ref, dec_pmode, and mv, which were used for the decoding, are stored in the corresponding relationship information accumulating memory 207 in association with the index of the decoding target frame and "pos" (or blk) (S515).

When decoding the encoded data of the additional information in S505, the decoding is performed while switching the code word table, similar to the above-described methods for encoding.

Here, before decoding the encoded data of the additional information, encoded data of the differential reference vector is decoded, and thus the reference vector used in block blk is already obtained.

First, dec_ref_vec is decoded.

It is highly possible that the frame indicated by dec_ref_vec is a frame which was used as a reference vector target frame in an adjacent area of block blk, or corresponds to a frame adjacent to the encoding target frame. Therefore, it is also highly possible that the frame indexes corresponding to such frames have been encoded, and the code word table is switched so that shorter-length code words are assigned to the relevant frame indexes in comparison with those assigned to the frame indexes corresponding to the other frames.

Then, dec_ref is encoded. Here, the code word table is switched using the already-decoded dec_ref_vec and the reference vector.

That is, by using encoding information of the reference vector target area which belongs to the frame dec_ref_vec and is indicated by the reference vector, the code word table is switched so that a short-length code word is assigned to a frame index which should appear frequently.

For example, if intra encoding is most frequently used in the reference vector target area although the frame dec_ref_vec is not "I frame", it represents that there is no area in another frame, which has image information close to that of the reference vector target area. Therefore, it is highly possible that dec_ref becomes equal to dec_ref_vec. In such a case, a code word table in which a short-length code word is assigned to the same frame index as dec_ref_vec is used.

Similarly, for a frame used as the reference frame or the reference vector target frame when decoding the reference vector target area, the wider the used part of the relevant frame, the higher the probability that the relevant frame is selected as dec_ref. Therefore, a code word table in which a code word is assigned to the frame in accordance with the relevant probability is used.

Finally, dec_pmode is decoded. The code word table is switched using the already-decoded dec_ref_vec and dec_ref, and frame information in the reference frame memory 205.

For example, if dec_ref_vec and dec_ref coincide with each other, it represents that only one corresponding area can be obtained for block blk, and thus dec_pmode value other than 1 is meaningless. Therefore, it is determined that dec_pmode is not included in the encoded data, and the decoded value thereof is set as 1.

In contrast, if dec_ref_vec and dec_ref do not coincide with each other, the possibility that 1 is selected as dec_pmode should be very low. Therefore, a code word table in which a short-length code word is assigned to each dec_pmode value other than 1 is used.

Additionally, if only two frames are stored in the reference frame memory, or if no appropriate intermediate frame for the combination of dec_ref_vec and dec_ref is stored in the reference frame memory 205, then no predicted image generating method which requires three corresponding areas cannot be used. Therefore, the code word table is switched so that a short-length code word is assigned to the other predicted image generating methods.

However, the code word table and the criterion for switching the table employed here should correspond to those employed in the corresponding encoding.

Additionally, as explained in the embodiment of the video encoding apparatus 100, instead of individually encoding the items of additional information, a number may be assigned to each combination thereof so as to encode the number. In such a case, the decoding is also performed by regarding that a number has been assigned to each combination.

Although the present invention has been explained in accordance with the embodiments, the present invention is not limited to the embodiments.

For example, in the embodiments, the intermediate frame is always a frame which satisfies that the time and viewpoint relationships between this frame and the reference vector target frame coincide with those between the encoding or decoding target frame and the reference frame.

However, a frame defined by another condition may be used while the encoding and decoding sides should have the same condition.

For example, the intermediate frame may be set to one of (i) a frame having a display time equal to that of the reference vector target frame and viewpoint information equal to that of the reference frame, and (ii) a frame having a display time equal to that of the reference frame and viewpoint information equal to that of the reference vector target frame, where between the two frames, one having the display time and the viewpoint information closer to those of the encoding or decoding target frame is selected.

When using the intermediate frame as selected above, an image variation from the reference vector target frame to the intermediate frame and an image variation from the intermediate frame to the reference frame are each caused by any one of a temporal factor or a camera factor, so that the amount of computation required for searching for a corresponding area can be reduced.

Also when using the intermediate frame as selected above, the possibility that the image information of an image generated by the predicted image generating method when pmode=5 is close to the image information of the encoding (or decoding) target area is reduced. This is because the assumption provided by the relevant predicted image generating method is not satisfied.

In such a case, (i) another condition may be applied such that the relevant predicted image generating method can be selected only when satisfying the condition assumed by the predicted image generating method such that the relationship between the reference frame and the encoding target frame coincides with that between the intermediate frame (selected by the relevant method) and the reference vector target frame, or (ii) the code word table may be switched depending on whether or not such an assumed condition is satisfied, so as to assign a shorter-length code word to a predicted image generating method which is more often selected than other methods.

Furthermore, while the embodiments do not mention intraframe encoding, it can easily be added as a method of generating a predicted image by, for example, allocating another number as the predicted image generating method.

In addition, a video encoding apparatus or a video decoding apparatus implemented by separately providing encoding modes (as in H.264) instead of providing predicted image generating methods can also be easily inferred from the present invention.

The video encoding and decoding processes as described above can also be implemented by a computer program. Such a computer program may be provided by storing it in an appropriate computer-readable storage medium, or by means of a network.

Although the video encoding and decoding apparatuses have been mainly explained in the above-described embodiments, the video encoding and decoding methods of the present invention can be implemented using the steps corresponding to the operation of each unit included in the video encoding and decoding apparatuses.

While embodiments of the present invention have been described with reference to the drawings, it should be understood that these are exemplary embodiments of the invention and are not to be considered as limiting.

Therefore, additions, omissions, or substitutions of structural elements, and other modifications for the above-described embodiments can be made without departing from the concept and scope of the present invention.

INDUSTRIAL APPLICABILITY

In accordance with the present invention, even when the reference frame used for generating a predicted image is different between adjacent areas, the same reference vector target frame is used, so that the primary factor (time or disparity) which causes an image variation and should be represented by a vector is unified, and a predicted vector close to a vector which should be encoded can be generated using an already-encoded vector in an adjacent area. Therefore, vector information for interframe predictive encoding can be encoded with a reduced amount of code.

The invention claimed is:

1. A video encoding method for encoding a video image by dividing an entire image into areas, generating a predicted image for each area of the divided image based on image information of a plurality of already-encoded frames, and encoding differential information between an image of an encoding target area in an encoding target frame and the predicted image, the video encoding method comprising:
   a reference vector target frame selecting step of selecting a reference vector target frame indicated by a reference vector of the encoding target area, from among the already-encoded frames, where the reference vector indicates an area which belongs to the reference vector target frame and corresponds to the encoding target area;
   a matching step of selecting a reference frame from among the already-encoded frames, and setting a reference vector target area which belongs to the reference vector target frame and has the same size as the encoding target area, where the image information of a reference area in the reference frame corresponds to image information of the reference vector target area;
   a predicted reference vector generating step of generating a predicted reference vector as a predicted vector of the reference vector of the encoding target area, by using the reference vector target frame of the encoding target area and a reference vector and a reference vector target frame which are used when encoding an adjacent area of the encoding target area;
   a predicted image generating step of generating the predicted image by using the image information of the reference area in the reference frame; and
   a differential information encoding step of encoding differential information between the image information of the encoding target area and the generated predicted image, wherein:
   the reference frame selected in the matching step is one of a reference frame and a reference vector target frame, which was used when encoding the reference vector target area, where:
     if said one of a reference frame and a reference vector target frame is a reference frame, the reference area in the reference frame is a reference area which was used when encoding the reference vector target area, and
     if said one of a reference frame and a reference vector target frame is a reference vector target frame, the reference area in the reference frame is a reference vector target area which was used when encoding the reference vector target area; and
   each of the steps are performed by a computer processor.

2. A video encoding method for encoding a video image by dividing an entire image into areas, generating a predicted image for each area of the divided image based on image information of a plurality of already-encoded frames, and encoding differential information between an image of an encoding target area in an encoding target frame and the predicted image, the video encoding method comprising:
   a reference vector target frame selecting step of selecting a reference vector target frame indicated by a reference vector of the encoding target area, from among the already-encoded frames, where the reference vector indicates an area which belongs to the reference vector target frame and corresponds to the encoding target area;
   a matching step of selecting a reference frame from among the already-encoded frames, and setting a reference vector target area which belongs to the reference vector target frame and has the same size as the encoding target area, where the image information of a reference area in the reference frame corresponds to image information of the reference vector target area;
   a predicted reference vector generating step of generating a predicted reference vector as a predicted vector of the reference vector of the encoding target area, by using the reference vector target frame of the encoding target area and a reference vector and a reference vector target frame which are used when encoding an adjacent area of the encoding target area;
   a predicted image generating step of generating the predicted image by using the image information of the reference area in the reference frame; and
   a differential information encoding step of encoding differential information between the image information of the encoding target area and the generated predicted image, wherein:
   the reference frame selected in the matching step is an already-encoded frame, where time and viewpoint information relationships between this already-encoded frame and the encoding target frame coincide with those between one of a reference vector target frame and a reference frame, which was used when encoding the reference vector target area, where:
     if said one of a reference vector target frame and a reference frame is a reference vector target frame, the reference vector target frame set for the encoding target area, and the reference area in the reference frame is an area which belongs to the selected reference frame and is indicated by a vector whose starting point is set at the encoding target area and which has the same direction and size as a reference vector which was used when encoding the reference vector target area, and
     if said one of a reference vector target frame and a reference frame is a reference frame, the reference area in the reference frame is an area which belongs to the selected reference frame and is indicated by a vector whose starting point is set at the encoding target area and which has the same direction and size as a vector which indicates a corresponding relationship between the reference vector target area and a reference area which was used when encoding the reference vector target area; and
   each of the steps are performed by a computer processor.

3. A video decoding method for decoding a video image by dividing an entire image into areas, generating a predicted image for each area of the divided image based on image information of a plurality of already-decoded frames, and decoding differential information between the predicted image and an image of a decoding target area in a decoding target frame, the video decoding method comprising:

a predicted reference vector generating step of generating a predicted reference vector as a predicted vector of a reference vector of the decoding target area, by using a reference vector and a reference vector target frame which are used when decoding an adjacent area of the decoding target area;

a reference vector generating step of generating the reference vector of the decoding target area by using the predicted reference vector, where the reference vector indicates an area which corresponds to the decoding target area and belongs to a reference vector target frame that is one of the already-decoded frames;

a reference frame area setting step of selecting a reference frame from among the already-decoded frames, and setting a reference area which belongs to the reference frame and has the same size as the decoding target area, where the image information of the reference area corresponds to image information of the reference vector target area; and a predicted image generating step of generating the predicted image by using image information of the reference frame, which corresponds to the reference area, wherein:

the reference frame selected in the reference frame area setting step is one of a reference frame and a reference vector target frame, which was used when decoding the reference vector target area, where:

if said one of a reference frame and a reference vector target frame is a reference frame, in the reference frame area setting step, a reference area which was used when decoding the reference vector target area is set as the reference area, and if said one of a reference frame and a reference vector target frame is a reference vector target frame, in the reference frame area setting step, a reference vector target area which was used when decoding the above reference vector target area is set as the reference area; and each of the steps are performed by a computer processor.

4. A video decoding method for decoding a video image by dividing an entire image into areas, generating a predicted image for each area of the divided image based on image information of a plurality of already-decoded frames, and decoding differential information between the predicted image and an image of a decoding target area in a decoding target frame, the video decoding method comprising:

a predicted reference vector generating step of generating a predicted reference vector as a predicted vector of a reference vector of the decoding target area, by using a reference vector and a reference vector target frame which are used when decoding an adjacent area of the decoding target area;

a reference vector generating step of generating the reference vector of the decoding target area by using the predicted reference vector, where the reference vector indicates an area which corresponds to the decoding target area and belongs to a reference vector target frame that is one of the already-decoded frames;

a reference frame area setting step of selecting a reference frame from among the already-decoded frames, and setting a reference area which belongs to the reference frame and has the same size as the decoding target area, where the image information of the reference area corresponds to image information of the reference vector target area; and a predicted image generating step of generating the predicted image by using image information of the reference frame, which corresponds to the reference area, wherein:

the reference frame selected in the reference frame area setting step is an already-decoded frame, where time and viewpoint information relationships between this already-decoded frame and the decoding target frame coincide with those between the reference vector target frame and one of a reference frame which was used when decoding the reference vector target area and a frame indicated by reference vector target frame designation information which was decoded when decoding the reference vector target area, where:

if said one of a reference frame and a frame is a reference frame, in the reference frame area setting step, an area, which belongs to the reference frame and is indicated by a vector whose starting point is set at the decoding target area and which has the same direction and size as a vector which indicates a corresponding relationship between the reference vector target area and a reference area which was used when decoding the reference vector target area, is set as the reference area, and if said one of a reference frame and a frame is a frame, in the reference frame area setting step, an area, which belongs to the reference frame and is indicated by a vector whose starting point is set at the decoding target area and which has the same direction and size as a reference vector which was used when decoding the reference vector target area, is set as the reference area; and each of the steps are performed by a computer processor.

5. A video encoding apparatus having devices for performing the steps in the video encoding method in accordance with claim 1.

6. A video encoding program by which a computer executes the steps in the video encoding method in accordance with claim 1.

7. A non-transitory computer-readable storage medium which stores a video encoding program by which a computer executes the steps in the video encoding method in accordance with claim 1.

8. A video decoding apparatus having devices for performing the steps in the video decoding method in accordance with claim 3.

9. A video decoding program by which a computer executes the steps in the video decoding method in accordance with claim 3.

10. A non-transitory computer-readable storage medium which stores a video decoding program by which a computer executes the steps in the video decoding method in accordance with claim 3.

11. A video encoding apparatus having devices for performing the steps in the video encoding method in accordance with claim 2.

12. A video decoding apparatus having devices for performing the steps in the video decoding method in accordance with claim 4.

13. The video encoding method in accordance with any one of claims 1 and 2, wherein:

in the predicted image generating step, the predicted image is generated using the image information of the reference area and the image information of the reference vector target area.

14. The video encoding method in accordance with any one of claims 1 and 2, wherein:

in the predicted image generating step, it is selected whether the predicted image is generated using the image information of the reference area, or using the image information of the reference area and the image information of the reference vector target area, and the predicted image is generated by the selected generating method; and the video encoding method further comprises:

a predicted image generating method designation information encoding step of encoding information which designates the selected generating method.

15. The video decoding method in accordance with any one of claims 3 and 4, wherein:

in the predicted image generating step, the predicted image is generated using the image information of the reference area and the image information of the reference vector target area.

16. The video decoding method in accordance with any one of claims 3 and 4, further comprising:

a predicted image generating method designation information decoding step of decoding, from the encoded data, information which designates whether the predicted image is generated using the image information of the reference area, or using the image information of the reference area and the image information of the reference vector target area, wherein:

in the predicted image generating step, the predicted image is generated by the generating method designated by the decoded information.

* * * * *